US011481197B1

(12) United States Patent
Comer

(10) Patent No.: US 11,481,197 B1
(45) Date of Patent: Oct. 25, 2022

(54) DISTRIBUTED SOFTWARE DEVELOPMENT PIPELINE FOR COHERENT GRAPHICAL USER INTERFACE

(71) Applicant: Cigna Intellectual Property, Inc., Wilmington, DE (US)

(72) Inventor: Christopher Comer, Erie, CO (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 197 days.

(21) Appl. No.: 16/862,048

(22) Filed: Apr. 29, 2020

Related U.S. Application Data

(63) Continuation-in-part of application No. 16/153,343, filed on Oct. 5, 2018, now abandoned.

(51) Int. Cl.
   *G06F 8/36* (2018.01)
   *G06F 8/65* (2018.01)
   *G06F 8/38* (2018.01)

(52) U.S. Cl.
   CPC ............... *G06F 8/36* (2013.01); *G06F 8/38* (2013.01); *G06F 8/65* (2013.01)

(58) Field of Classification Search
   CPC .................................. G06F 8/38; G06F 8/65
   See application file for complete search history.

(56) References Cited

U.S. PATENT DOCUMENTS

| | | | |
|---|---|---|---|
| 6,536,037 B1 * | 3/2003 | Guheen | G06F 8/71 703/2 |
| 6,615,166 B1 * | 9/2003 | Guheen | G06Q 10/06 703/27 |
| 7,315,825 B2 * | 1/2008 | Rosenfeld | G16H 40/67 705/2 |
| 7,318,216 B2 | 1/2008 | Diab | |
| 7,747,980 B2 | 6/2010 | Illowsky | |
| 8,880,513 B2 | 11/2014 | Sundaresan | |
| 9,170,825 B2 | 10/2015 | Goetz | |
| 9,336,128 B2 | 5/2016 | Li | |
| 9,392,920 B2 | 7/2016 | Halloran | |
| 9,414,116 B2 | 8/2016 | Ladd | |
| 9,420,121 B2 | 8/2016 | Grosz | |
| 10,083,158 B2 | 9/2018 | McWilliams | |
| 10,318,285 B1 * | 6/2019 | Jodoin | G06F 8/60 |

(Continued)

*Primary Examiner* — Lewis A Bullock, Jr.
*Assistant Examiner* — Theodore E Hebert
(74) *Attorney, Agent, or Firm* — Miller Johnson

(57) ABSTRACT

A computer system includes memory and at least one processor. The memory stores a codebase, multiple reusable software modules, and computer-executable instructions. The codebase includes an application class extension, an activity class extension, a module base definition class, and a theme. The instructions include creating a software application using the application class extension and the theme from the codebase, registering at least one of the multiple reusable software modules to the software application, and configuring the software application to arrange navigation for each activity of each reusable software module registered to the software application, to present a same user experience throughout the software application. The instructions also include configuring the software application to automatically apply a same layout theme for each activity of each reusable software module registered to the software application, to present a same user experience throughout the software application.

18 Claims, 9 Drawing Sheets

(56) References Cited

U.S. PATENT DOCUMENTS

| | | | |
|---|---|---|---|
| 10,489,497 B2 | 11/2019 | McWilliams | |
| 10,620,937 B1* | 4/2020 | Brass | G06F 8/65 |
| 11,157,259 B1* | 10/2021 | Lin | G06F 8/36 |
| 2009/0106731 A1* | 4/2009 | Coulthard | G06F 8/24 |
| | | | 717/101 |
| 2011/0145805 A1 | 6/2011 | Taylor | |
| 2012/0204142 A1 | 8/2012 | Rubenstein | |
| 2014/0137079 A1* | 5/2014 | Witteborg | G06F 8/71 |
| | | | 717/120 |
| 2014/0223425 A1* | 8/2014 | Brown | G06F 8/65 |
| | | | 717/173 |
| 2017/0147298 A1 | 5/2017 | Ramanathan | |
| 2017/0293592 A1 | 10/2017 | He | |
| 2018/0060065 A1* | 3/2018 | Lai | G06F 8/71 |
| 2018/0373507 A1 | 12/2018 | Mizrahi | |
| 2019/0278591 A1 | 9/2019 | Sharma | |
| 2019/0286427 A1 | 9/2019 | Pivato | |
| 2019/0317982 A1 | 10/2019 | Chitale | |
| 2020/0110597 A1* | 4/2020 | Comer | G06F 9/454 |
| 2020/0125345 A1 | 4/2020 | Belagali | |
| 2020/0301763 A1 | 9/2020 | Chandoor | |

\* cited by examiner

DISTRIBUTED SOFTWARE DEVELOPMENT PIPELINE FOR COHERENT GRAPHICAL USER INTERFACE

CROSS-REFERENCE TO RELATED APPLICATIONS

This application is a continuation-in-part of U.S. patent application Ser. No. 16/153,343 filed Oct. 5, 2018. The entire disclosure of the application referenced above is incorporated by reference.

FIELD

The present disclosure generally relates to systems and methods for generating a software application and, in particular, to systems and methods for generating software applications that maintain a consistent graphical user interface (GUI) among disparate elements.

BACKGROUND

Software applications are often generated from different pieces coded by different developers and, in particular, different software modules that are independently coded by different developers (e.g., built, tested, debugged, etc. by different developers). Conventionally, the software modules each define their own graphical user interface (GUI) as realized by the respective developer. Accordingly, when one or more of the software modules are integrated into a software application, the GUI provided by each software module is often inconsistent with the GUI(s) provided by one or more other software modules integrated into the software application and/or the overall GUI provided by the broader software application itself. This leads to a poor user experience (UX) and often impairs the ability of the user to navigate between and access features provided by the software modules.

In addition, companies often develop different software applications for customers to use. Different teams of the company may create new software modules each time a new software application is created, even if there is a same or similar functionality provided by a software application module developed by another team. One reason for this is that borrowing a software application module from another team may lead to a poor UX.

Because of this, each software application module is often stored in a codebase that is specific to the team that developed the software application. Each team generally develops software applications using only the software application modules in its own codebase and, potentially, only the software application modules in a codebase specific to the software application under development. This may lead to different codebases being designed and used for the development of software applications, duplication of effort, and increased difficulty in maintaining each application separately.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method for generating a software application includes creating at least one reusable software module by extending a module base definition class from a codebase. The codebase includes an application class extension, an activity class extension, the module base definition class, and a theme. The method includes creating at least one activity for the at least one reusable software module using the activity class extension from the codebase. The activity class extension provides a standardized layout and navigation handling that applies to all activities of all reusable software modules built from the activity class extension. The method also includes creating a software application using the application class extension and the theme from the codebase, registering the at least one reusable software module to the software application, and configuring the software application to arrange navigation for each activity of each reusable software module registered to the software application, to present a same user experience throughout the software application. The method further includes configuring the software application to automatically apply a same layout theme for each activity of each reusable software module registered to the software application, to present a same user experience throughout the software application.

In other features, configuring the software application to automatically apply a same layout theme includes configuring the software application to apply an application-wide override theme on top of a default theme for the at least one activity at startup of the at least one activity. In other features, the computer-implemented method includes configuring the at least one activity to set a user interface for a screen of the at least one activity, wherein content of the user interface is determined by the at least one activity and arrangement of toolbars and navigation anchors of the user interface is determined by the software application.

In other features, the computer-implemented method includes creating at least one fragment for the at least one reusable software module using a fragment class extension from the codebase, the fragment class extension providing a standardized layout and navigation handling that applies to all fragments of all reusable software modules built from the fragment class extension. The method includes configuring the software application to arrange navigation for each fragment of each reusable software module registered to the software application, to present a same user experience throughout the software application, and configuring the software application to automatically apply a same layout theme for each fragment of each reusable software module registered to the software application, to present a same user experience throughout the software application.

In other features, creating the at least one reusable software module includes creating a plurality of reusable software modules, where each reusable software module includes at least one corresponding activity, and registering the reusable software module to the software application includes registering at least two of the plurality of reusable software modules into the software application.

In other features, the computer-implemented method includes updating at least one of the plurality of reusable software modules and registering the updated at least one reusable software module to the software application when a previous version of the at least one reusable software module was registered to the software application prior to updating the at least one reusable software module. In other features, the computer-implemented method includes updating at least one of the plurality of reusable software modules and maintaining an original version of the at least one reusable software module in the software application when the original version of the at least one reusable software module was registered to the software application prior to updating the at least one reusable software module.

In other features, at least one of the plurality of reusable software modules comprises a general reusable software module from which at least one other reusable software module depends. In other features, the computer-implemented method includes integrating the general reusable software module into the software application and removing one of the at least two other reusable software modules from the software application.

In other features, creating the reusable software module includes obtaining common UI and core services components from an operating system, creating the software application includes creating login and authentication hooks using the obtained core services components, and the method includes deploying the software application to a digital distribution platform. In other features, the codebase further includes a fragment class extension, and the application class extension, the activity class extension, and the fragment class extension comprise extensions of base application, activity and fragment classes of an ANDROID operating system.

In other features, a computer system includes memory configured to store a codebase, multiple reusable software modules, and computer-executable instructions. The codebase includes an application class extension, an activity class extension, a module base definition class, and a theme. Each reusable software module is an extension of the module base definition class from the codebase and includes at least one activity built from the activity class extension of the codebase. The activity class extension provides a standardized layout and navigation handling that applies to all activities of all reusable software modules built from the activity class extension. The at least one processor is configured to execute the instructions. The instructions include creating a software application using the application class extension and the theme from the codebase, registering at least one of the multiple reusable software modules to the software application, and configuring the software application to arrange navigation for each activity of each reusable software module registered to the software application, to present a same user experience throughout the software application. The instructions also include configuring the software application to automatically apply a same layout theme for each activity of each reusable software module registered to the software application, to present a same user experience throughout the software application.

In other features, configuring the software application to automatically apply a same layout theme includes configuring the software application to apply an application-wide override theme on top of a default theme for each activity at startup of each activity. In other features, each activity includes a user interface for a screen of the activity, content of the user interface is determined by the activity, and arrangement of toolbars and navigation anchors of the user interface is determined by the software application.

In other features, the codebase incudes a fragment class extension, each reusable software module includes at least one fragment built from a fragment class extension from the codebase, the fragment class extension provides a standardized layout and navigation handling that applies to all fragments of all reusable software modules built from the fragment class extension, and the instructions further include configuring the software application to arrange navigation for each fragment of each reusable software module registered to the software application, to present a same user experience throughout the software application.

The instructions also include configuring the software application to automatically apply a same layout theme for each fragment of each reusable software module registered to the software application, to present a same user experience throughout the software application.

In other features, the codebase further includes a fragment class extension, and the application class extension, the activity class extension, and the fragment class extension comprise extensions of base application, activity and fragment classes of an ANDROID operating system.

A computer-implemented method for generating a library of reusable software modules includes creating a first reusable software module by extending a module base definition class from a codebase. The codebase includes an application class extension, an activity class extension, a fragment class extension, the module base definition class, and a theme. The method includes creating at least one activity for the first reusable software module using the activity class extension from the codebase. The activity class extension provides a standardized layout and navigation handling that applies to all activities of all reusable software modules built from the activity class extension. The method includes storing the first reusable software module in the library of reusable software modules, creating a second reusable software module by extending the module base definition class from the codebase, creating at least one activity for the second reusable software module using the activity class extension from the codebase, creating at least one fragment for the at least one activity of the second reusable software module using the fragment class extension from the codebase, and storing the second reusable software module in the library of reusable software modules. The library of reusable software modules facilitates creation of a software application using the application class extension and the theme from the codebase, facilitates registration of the first and second software modules to the software application, and facilitates configuration of the software application to arrange navigation for each activity and fragment of the first and second reusable software modules and to apply a same layout theme for each activity and fragment of the first and second reusable software modules in in order to present a same user experience throughout the software application.

In other features, the computer-implemented method includes creating at least one fragment for the at least one activity of the first reusable software module using the fragment class extension from the codebase. The fragment class extension provides a standardized layout and navigation handling that applies to all fragments of all reusable software modules built from the fragment class extension. The method includes creating at least one fragment for the at least one activity of the second reusable software module using the fragment class extension from the codebase.

In other features, the computer-implemented method includes updating the first reusable software module and providing the updated first reusable software module to a software application when a previous version of the first reusable software was registered to the software application prior to updating the first reusable software module. In other features, the codebase further includes a fragment class extension, and the application class extension, the activity class extension, and the fragment class extension comprise extensions of base application, activity and fragment classes of an ANDROID operating system.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
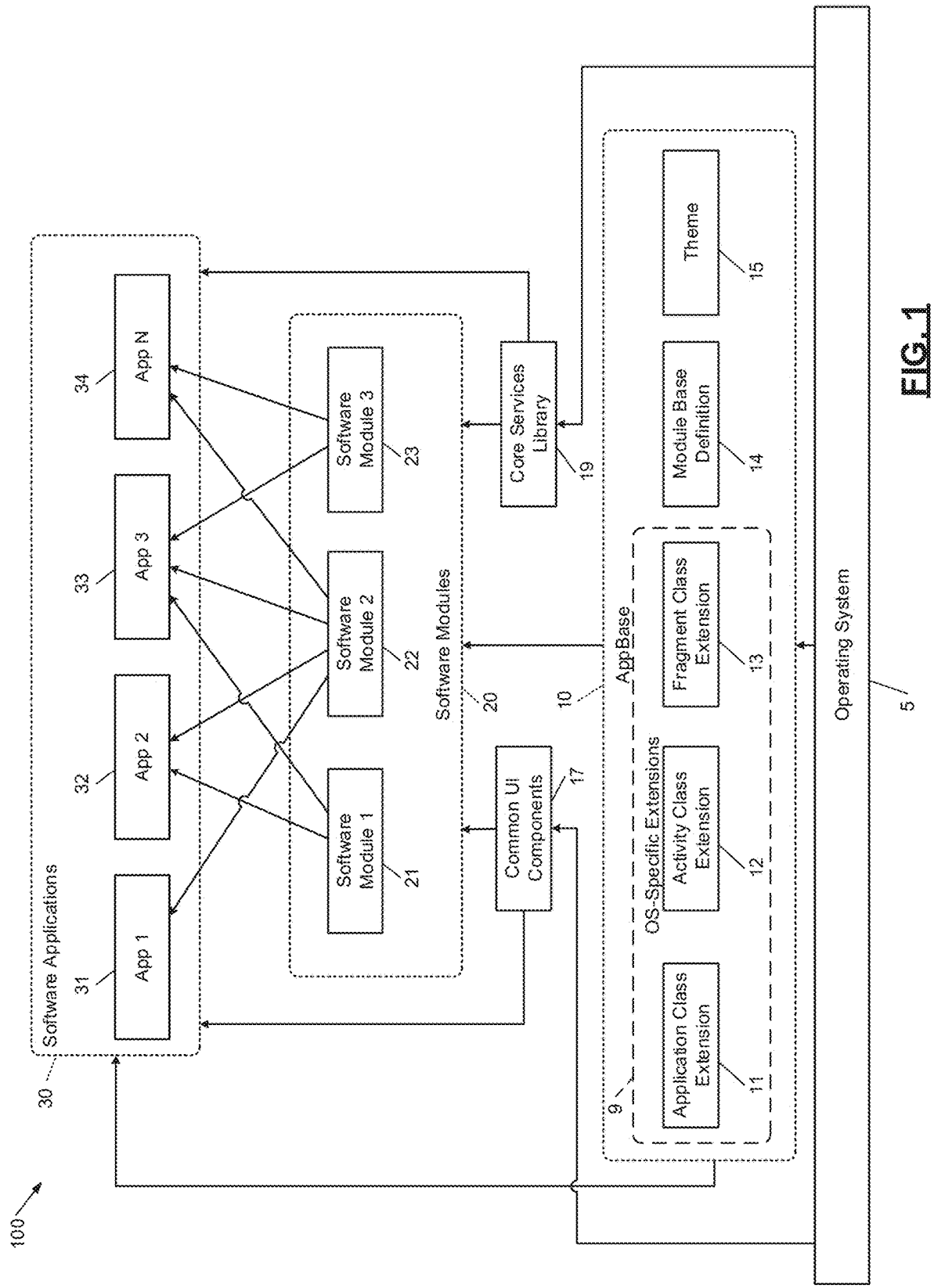
FIG. 1 is a functional block diagram of an example system for generating a software application, according to some aspects of the present disclosure.

In the scenario described above, different teams may develop custom or single-use code. Alternatively, one team may develop a software application module and recognize that it may be used by other teams, so the module may be cloned to be used in other applications. The module may present identical (or nearly identical) experiences to an application end-user, such as a customer. However, each software application that incorporates the module is an entirely separate project and codebase, each of which must be updated, maintained, and tested independently.

The inventor has developed a framework or a platform for writing software applications (also known as apps). The framework may include a single application codebase, which is used to generate software modules that are then used to make the app. More than one application may use each software module, but the software module may not be cloned for each app. Instead, the author or owner of the software application takes certain steps to incorporate the application codebase into the software application. Thus, when a change needs to be made to the module, the module developer modifies that module once, and the change is distributed to each application that uses the module. In practice, the module developer updates and releases a new version of that module to a content repository such as the Apache Maven software project management tool. Then, application owners/authors may update their apps to the latest version of the module to consume the changes. App owners/authors can also choose to remain on specific/older versions depending on their use case.

In addition, the systems and methods described herein uniquely provide for generating (e.g., linking, compiling, etc.) a software application and, in particular, generating a software application that is based on one or more independently developed software modules while maintaining a consistent graphical user interface (GUI). In various implementations, an application configuration engine is configured to retrieve multiple software application modules (e.g., from a module repository, etc.). Each software application module includes a re-usable logic and provides one or more screens (e.g., activities or fragments, etc.). Each screen incorporates (e.g., extends, etc.) a screen model (e.g., an activity or fragment model, etc.) from a codebase (referred to below as "AppBase" in one example).

The screen model integrated by each screen of the software application module provides an aspect of a GUI for the screen (e.g., a layout for the screen, content for navigation of the screen, content for a menu of the screen, content for a toolbar of the screen, etc.). The software modules are then integrated into the software application (e.g., an Android application, etc.). The software application incorporates (e.g., extends, etc.) a software application model from the codebase. The software application model also provides one or more aspects of the GUI (e.g., navigation for the screens provided by each software module, a theme for the screens provided by each software module, etc.). In this manner, common screen models and/or application models may be incorporated by software modules and/or software applications to help ensure that the software application integrating the software provides a consistent GUI to the user.

Further, the software application may be configured to receive a credential of a user of the software application and store the credential for distribution to the software modules integrated into the software application, such that the software modules can use the credential without having to re-obtain the credential each time the credential is needed to authenticate the user (e.g., for one or more services provided to or accessed by the software modules, etc.).

Software Development System Devices

Figure 7:
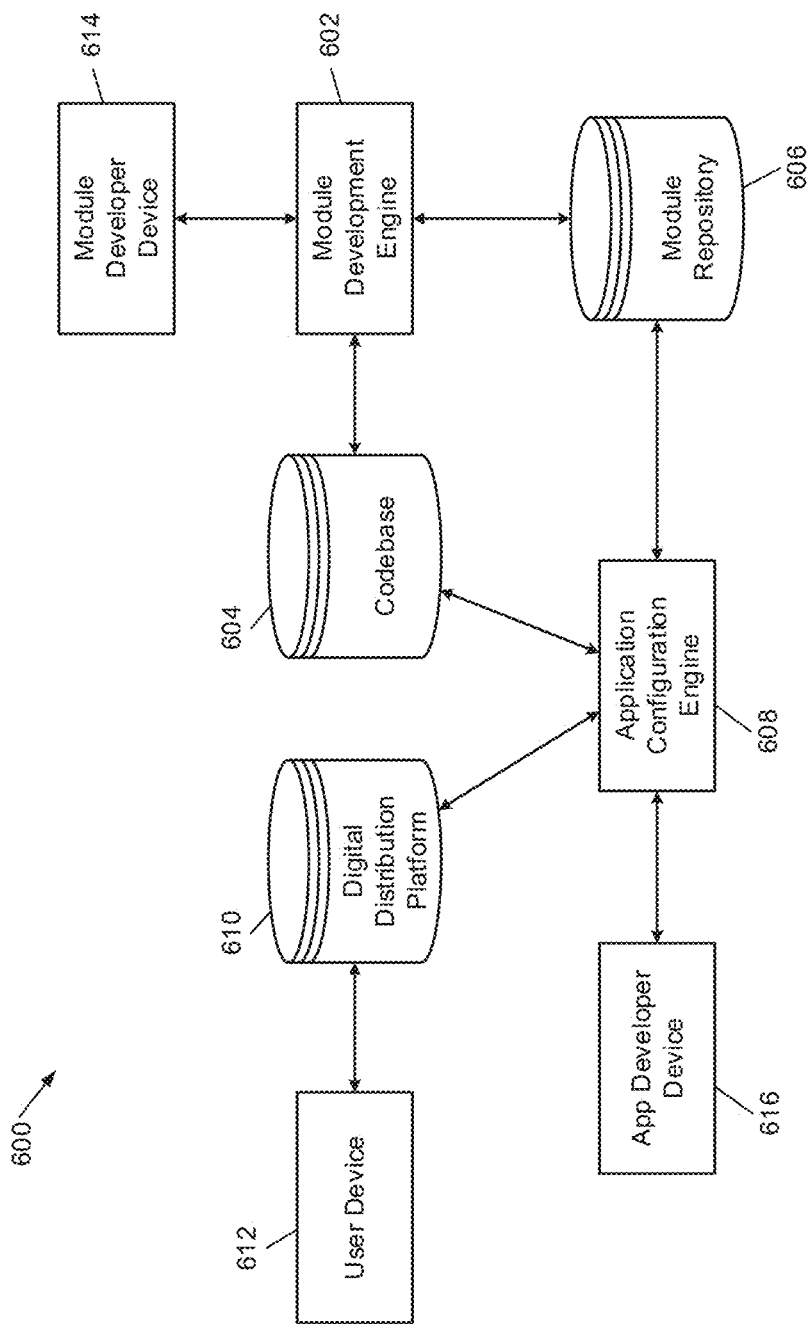
FIG. 7 is a functional block diagram of an example system of the present disclosure suitable for use in generating software applications.

FIG. 7 illustrates an example system 600 in which one or more aspects of the present disclosure may be implemented. Although the system 600 is presented in one arrangement, various implementations may include some or all of the parts of the system 600 (or additional parts) arranged in a different manner. In the example embodiment of FIG. 7, the system 600 includes a module development engine 602, a codebase 604, a module repository 606, an application configuration engine 608, a digital distribution platform (e.g., application repository) 610, a user device 612, a module developer device 614 and an app developer device 616. For example, the user device 612, module developer device 614 and app developer device 616 may include any suitable mobile phone, computer, etc.

As described in more detail throughout the present disclosure, the development engine 602 is generally configured to generate one or more software application modules that incorporate (e.g., extend) a screen model from the codebase 604. The development engine 602 is generally configured to store the software application modules in the module repository 606. The application configuration engine 608 is generally configured to retrieve one or more software application modules from the module repository 606 and integrate (e.g., compile and link) the software application modules into a software application stored in the digital distribution platform 610 (e.g., GOOGLE PLAY, APPLE APP STORE, etc.). The software application may be downloaded, installed, etc., from the digital distribution platform 610, and when executed by a processor of the user device 612, may cause the user device to provide one or more functions consistent with a logic included in the software application while providing a consistent GUI to a user of the user device 612.

Figure 8:
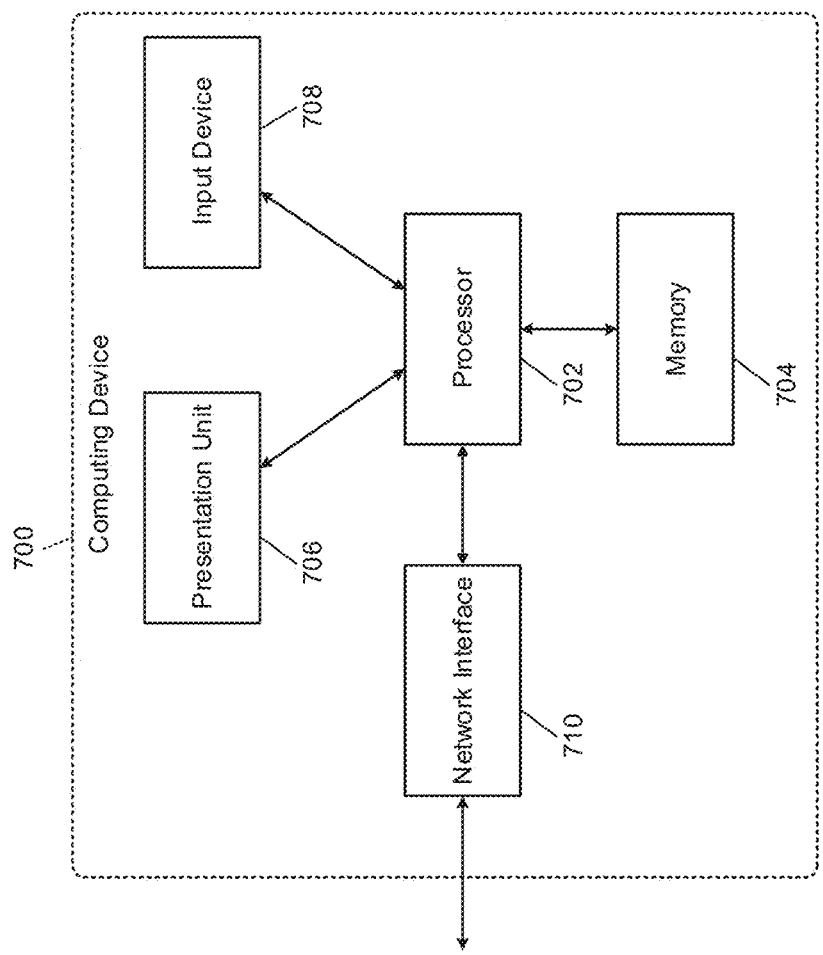
FIG. 8 is a functional block diagram of a computing device that may be used in the example system of FIG. 7.

FIG. 8 illustrates an example computing device 700 that can be used in the system 600. The computing device 700 may include, for example, one or more servers, workstations, personal computers, laptops, tablets, smartphones, etc. In addition, the computing device 700 may include a single computing device, or it may include multiple computing devices located in close proximity or distributed over a geographic region, so long as the computing devices are specifically configured to operate as described herein. In the example embodiment of FIG. 7, the development engine 602, the application configuration engine 608, the user device 612, the module developer device 614 and the application developer device 616 may each include one or more computing devices consistent with computing device 700. The codebase 604, the module repository 606, and the digital distribution platform 610 may also each be understood to be consistent with the computing device 700 and/or implemented in a computing device consistent with computing device 700 (or a part thereof, such as, e.g., memory 804, etc.). However, the system 600 should not be considered to be limited to the computing device 700, as described below, as different computing devices and/or arrangements of computing devices may be used. In addition, different components and/or arrangements of components may be used in other computing devices.

As shown in FIG. 8, the example computing device 700 includes a processor 702 including processor hardware and a memory 704 including memory hardware. The memory 704 is coupled to (and in communication with) the processor 702. A presentation unit 706 may output information (e.g., interactive interfaces, etc.), visually to a user of the computing device 700. Various interfaces (e.g., as defined by software applications, screens, screen models, GUIs etc.) may be displayed at computing device 700, and in particular at presentation unit 706, to display certain information to the user. The presentation unit 706 may include, without limitation, a liquid crystal display (LCD), a light-emitting diode (LED) display, an organic LED (OLED) display, an "electronic ink" display, speakers, etc. In some embodiments, presentation unit 706 may include multiple devices. Additionally or alternatively, the presentation unit 706 may include printing capability, enabling the computing device 700 to print text, images, and the like on paper and/or other similar media.

In addition, the computing device 700 includes an input device 708 that receives inputs from the user (i.e., user inputs). The input device 708 may include a single input device or multiple input devices. The input device 708 is coupled to (and is in communication with) the processor 702 and may include, for example, one or more of a keyboard, a pointing device, a mouse, a stylus, a touch sensitive panel (e.g., a touch pad or a touch screen, etc.), or other suitable user input devices. In various implementations, the input device 708 may be integrated and/or included with the presentation unit 706 (for example, in a touchscreen display, etc.). A network interface 710 coupled to (and in communication with) the processor 702 and the memory 704 supports wired and/or wireless communication (e.g., among two or more of the parts illustrated in FIG. 7).

Referring again to FIG. 7, the development engine 602, application configuration engine 608, the user device 612, the module developer device 614 and the app developer device 616 are each specifically configured by computer-executable instructions to perform one or more of the operations described herein. In the illustrated embodiment, the development engine 602, application configuration engine 608, the user device 612, the module developer device 614 and the app developer device 616 are each shown as a standalone part of the system 600. In various implementations, the development engine 602, the application configuration engine 608, the user device 612, the module developer device 614 and/or the app developer device 616 may be incorporated together (e.g., as a single computing device 700). Alternatively or additionally, in various implementations the development engine 602, the application configuration engine 608, the user device 612, the module developer device 614 and/or the app developer device 616 may be incorporated be associated with, or incorporated with, still other parts of the system 600: for example, the codebase 604, the module repository 606, or the digital distribution platform 610, etc. Further, in various embodiments, the development engine 602, the codebase 604, the module repository 606, the application configuration engine 608, the digital distribution platform 610, the module developer device 614 and the app developer device 616 may be embodied in at least one computing device 700 and accessible as a network service (e.g., a web service such as a cloud-based service, etc.), via, for example, an application programming interface (API), etc.

The development engine 602 includes an integrated development environment (IDE). The development engine 602 is configured to generate multiple software modules (e.g., in Java, etc.). The example software modules relate to services provided by a health insurance provider. However, the software modules may relate to any other type of service or functionality in one or more other embodiments. Each software module includes re-usable logic (broadly, code) that, when executed by a processor 702 of the mobile device 712, causes the mobile device 712 to provide one or more functionalities to a user of the mobile device 712. The software modules may include, for example, a journaling module that accepts and stores user input in a memory 704 of the mobile device 712 to track the health or wellbeing of the user; a customer relationship management (CRM) messaging module that provides an inbox of messages from the health insurance avoider for the user displays promotions (e.g., advertisements, business promotions, etc.) to the user; a click-to-chat (C2C) module that allows a user to initiate and participate in a chat session with an agent of the health insurance provider; and a mapping module that displays maps that identify locations of the health insurance provider.

Other software modules may include, for example, a programs module that guides the user through a number of planned activities for specific purposes (e.g., well-being purposes, etc.); a telehealth module that provides integrated video conferencing with medical professionals in real-time and associated scheduling functionality; a user assessment module that provides a series of questions (e.g., health or well-being questions, etc.) to elicit responses from the user; an updates module that provides updates from the health insurance provider (e.g., new services or offerings, updates regarding the user's insurance coverage, etc.); a curated moment module that provides, for example, a curation of different health events of the user; a messaging module that provides, for example, the ability for a user to interact in a live-chat with a designated agent; a FIDO (Fast Identity Online) module that provides authentication (e.g., biometric authentication, etc.) for the user to access services or information provided through the other modules; and a database module that provides for persistent or temporary storage of data related to the other modules. In one or more other embodiments, the software modules may provide any of a variety of other functionalities or services.

The software modules each include re-usable logic (e.g., a code, a method, a function, etc.) that carries out the above describe functionalities. The logic of each software module is re-usable in that the logic and, thus, the software module may be incorporated into any of a variety of different software applications that may integrated different combinations of software modules.

The software modules also each provide one or more screens. Each screen may include one or more panes. The example software modules provide one or more screens that each include an Android activity, where each activity may include one or more fragments. Each screen and, more particular, each activity or fragment, provides a window in which a software application incorporating the software module providing the screen/pane/activity to draw a graphical user interface (GUI) for the screen/pane/activity. Conventionally, a software module providing the screen/pane/activity is generally responsible for providing (e.g., defining, specifying, drawing, etc.) all aspects of the GUI for the screens/panes/activities (e.g., in Android application development, etc.). Software modules and the screens/panes/activities provided thereby, however, are often each developed by different developments teams. As a result, the GUIs for the screens/activities provided by the different software modules are often inconsistent and lead to a poor user experience. And, even where software modules may be developed by the same team, development becomes redundant and inefficient when each software modules must be independent developed to provide a consistent GUI.

To address these problems the example software modules each incorporate (e.g., extend, etc.) a screen model from the codebase 604. The example screen model includes an activity model and a fragment model, where the activity model may be incorporated or extended by screens/activities of the software modules and the fragment model may be imported or extended by screens/fragments of the software modules. And, the example codebase 604 includes a data structure. In the illustrated example, codebase 604 is an Android codebase. In one or more other embodiments, the codebase 604 may include a different type of codebase (for example, an iOS codebase, etc.).

In any case, the screen model provides one or more aspects of the GUI for each screen incorporating or extending the screen model. The one or more aspects of the GUI provided by the screen module include a layout for the screen, a content for a navigation for the screen, a content for a menu of the screen, and/or a content for a toolbar for the screen.

The development engine 602 is configured to store the generated software modules in the module repository 606 (a Nexus repository, etc.). The application configuration engine 608 (e.g., an IDE, etc.) is configured to retrieve any combination of one or more software modules form the module repository 606 and integrate (e.g., compile, etc.) the software modules retrieved from the module repository 606 into a software application that incorporates a software application model from the codebase 604. The software application model also provides one or more aspects of the GUI for each screen/activity/fragment provided by each software module integrated into the software application that extends the software application model. The one or more aspects of the GUI provided by the example software application model may include, for example, a navigation for each screen/activity/fragment provided by the software modules (e.g., to navigation between the screens/activities/fragments provided by an individual software module, etc.); a navigation for the overall software application (e.g., to navigate from software module to software module, etc.); a theme from the codebase 604 for each screen/activity/fragment provided by the software modules; a theme from the codebase 604 for the overall software application; and/or a menu or a toolbar for each screen provided by the software modules.

In various implementations, the development engine 602 and/or the application configuration engine 608 may be configured to modify any one or more of the software modules to override any one or more aspects (or at least part) of the GUI provided by the screen model and/or the software application. In this manner, the software application may provide a consistent UX to the user of the software application while allowing for module-specific customizations.

In addition, the example software application, when executed by a processor of the user device 612, may be configured to receive a credential (e.g., a biometric, a token, a username/password, etc.) of a user of the software application (e.g., via the GUI or an operating system of the user device 612, etc.) and store the credential in a memory 604 accessible by the software application. Such receipt and storage may be performed, for example, by a FIDO module integrated into the software application. In any case, the software application is configured to (e.g., via the FIDO module, etc.) distribute the credential to one or more other software modules integrated into the software application, such that the software modules may use the credential without having to re-obtain the credential each time the credential is needed to authenticate the user (e.g., for one or more services provided or accessed by the software modules, etc.).

With the software modules integrated into the software application, the application configuration engine 608 is configured to publish the software application to the digital distribution platform 610 for retrieval by the user device 612, whereby the user device 612 may retrieve and execute the software application.

Software Module and Application Relationships

FIG. 1 is a block diagram of a system 100 for generating a software application according to various implementations. The system 100 is described in reference to a particular codebase 604, referred to here as AppBase 10. More particularly, the system 100 includes software modules 20 (e.g., software application modules consistent with those described above in reference to the example system 600, etc.), common user interface (UI) components 17, and a core services library 19. Broadly, AppBase 10 is used to generate one or more software modules 21-23 with the help of common UI components 17 and core services library 19.

Access to each software module is then included in the code for one or more software applications 30 (of which 4 are illustrated), which share the module and its functionality. Software applications 30 may be any type of software program generally intended for use by an end-user (e.g., of a user device 612 running the software applications 30, etc.), and include what are colloquially called "apps," which are used on smartphones, tablets, and other mobile devices. Software applications 30 are not, however, limited to "apps" or to use on mobile devices, and may be deployed on any type of desktop, laptop, or other computer. Software applications 30 may pull in and use the core services and common UI components and may use any combination of software modules without requiring separate configuration.

During development, a module developer may use the AppBase 10 to generate or produce modules 20 (e.g., via a development engine 602, etc.) and store the modules 20 (e.g., in the module repository 606, etc.), where the modules 20 are consumed by an app owner (e.g., by retrieving the modules 20 from the module repository 606, etc.). The app owner generates the app 30 (e.g., via an application configuration engine 608, etc.) and provides it to an end user (e.g., via a digital distribution platform 610, etc.). The module developer also generates or produces updates to the modules 20, which may be incorporated into the app 30 by the app owner (e.g., by retrieving the updated modules 20 from the module repository 606, etc.). Subsequently, the end-user may update the app 30 with updates provided by the app owner (e.g., via the digital distribution platform 610, etc.).

One embodiment of the invention may be implemented using an Android operating system 5 (which in turn is built on the Java programming language), which will be used to illustrate aspects of the invention. The AppBase 10, implemented using the operating system 5, includes extensions to the Android standard base classes (broadly, base models), such as of Application, Activity, and Fragment, a Module class, and a Theme, which provide common functionality. "Class" is a term used in the context of Java to represent code that generally provides a model or blueprint that serves as a template for creating (or instantiating) specific objects (e.g., activities, fragments, etc.) within a program. In connection therewith, the class generally provides initiate values and implements of behaviors (functions or methods) that may be used or expanded upon by the objects integrated (e.g., extending) the class. An "activity" may be a screen presented to an end-user, and a single activity may present multiple "fragments" (e.g., panes of the screen, etc.) to the end-user. These fragments may be independent of each other or may share data via the activity. Thus, every screen an end-user sees in an Android application is either an activity or a fragment, and they are all held together by the application class. A Theme is a collection of color, image, and size resource values that will be applied to the entire application. The AppBase 10 extends (adds functionality to) the Application, Activity, and Fragment classes. In order to use the AppBase framework/platform, each application and module must be built using the AppBase versions of these classes.

AppBase 10 supports design, development, and inclusion of software modules 20. In this embodiment, AppBase 10 includes an Application Class Extension 11, an Activity Class Extension 12 (e.g., a screen model consistent with that which is described above in reference to the example system 600, etc.), a Fragment Class Extension 13 (e.g., a screen model consistent with that which is described above in reference to the example system 600, etc.), a Module Base Definition class 14, and a Theme 15 (e.g., a theme consistent with that which is described above in reference to example system 600, etc.). The Extensions 11, 12 and 13 may be considered as OS-Specific Extensions 9. The Extensions 11, 12 and 13 are related to the Android operating system, although various implementations could use other extensions, other operating systems etc.

The software modules 20 may be extensions of the Module Base Definition class 14. For example, the AppBase 10 may define what a module 20 is through JAVA polymorphism, etc. The individual modules 20 inherit the definitions from the AppBase 10 (e.g., via the Module Base Definition class 14).

AppBase 10 may also include analytics code; "AppCenter" (e.g. hockeyApp) code, which is Microsoft® utility code that manages application releases and tracks issues in deployed code; common and system utilities; data storage; module interface definition; HTTP (global) request/response processing; and Android M (a version of the Android OS) permissions handling. (Compared to previous versions of the Android OS, Android M changed the way the system handles permissions (to access storage, camera, etc.). The permissions utility code makes it easier for app owners using AppBase 10 to leverage the new calls without concern for OS version or system limitations.)

AppBase 10 is used to create one or more software modules 20, which represent self-contained functionalities that are larger than a single "component" but smaller than an entire software application 30. A "component" in this context is a single item within a larger Activity or Fragment (i.e. screen/page). Modules 20 are used to specify larger logical blocks such as complex calculations, a series of screens, or advanced data processing. These typically consist of many components working together. Modules are built on top of AppBase 10 (e.g., by integrating, extending, etc. models included within the AppBase 10, etc.) and use a standard theming technique (e.g., uniformly applied by the software application to the modules 20, such as screens provided by the modules 20, etc.), so that when they are used in an application they do not appear out of place.

Notwithstanding the standard theming technique, the modules 20 are highly configurable in that they can be customized to different applications 30, languages, themes, and/or storage methodologies. Modules 20 are functional on their own, so they can be plugged (referenced/pulled-in via a build file and loaded via a single Initialize call at application boot) into any application 30 built using AppBase 10, and operate without other considerations or requirements. Almost always, modules 20 provide a series of configurations so that applications 30 can customize their behavior, but the default values will result in a valid functional and generally standardized experience. Modules 20 are independent of each other, are application agnostic, and provide interfaces and callbacks so that applications 30 can inject alternate or app-specific data as required. Specific modules 20 (such as those that connect to distinct application programming interfaces (APIs) or services) may include their own network handling. When a network is required, because, e.g., the module 20 needs to retrieve data from some place other than the local device (i.e. a server), the module 20 defines its own environment and specifies by key when making calls. Software applications 30 are allowed to and are able to replace environment configurations at compile time.

Software modules 20 contain string resources for all supported languages—the software application itself should be written to lock the end-user into its desired regional support. In the Android OS, string resources typically comprise a file with all user-visible strings/sentences within it, and that file is referenced from the application code so that the application 30 can display in a different language by changing the file reference. AppBase 10 may automatically lock the user into regional support ("locale locking") using values within a configuration file (which may be named "config.xml") that can be overridden by any application. Applications 30 are able to add language support with varying results by providing additional translation files. For example, an application may support more languages than its modules do, in which case, the end-user would be presented with different languages in different sections of the application. (i.e., the main app can be written to support English, Spanish, and French, but if Module A supports only English and Spanish, and Module B supports only French, end-users set to those locales would see varying content as they navigate through the app. Applications that support more languages than modules do are able to provide the translation files for module-strings at compile time, to prevent the different-language-on-different-screens scenario.

As shown in FIG. 1, the applications 30 may use only one module 20, multiple modules 20, or all modules 20. For example, the application 31 uses only the software module 22, while the application 32 uses both the software module 21 and the software module 22. The application 34 also uses two modules, while the application 33 uses all three of the modules 21, 22 and 23. FIG. 1 also illustrates that the software applications 30 may incorporate the common UI components 17 and the core services library 19 from the operating system 5, as well as the extensions 11-15 from the AppBase 10. The modules 20 may also use the common UI components 17 and the core services library 19 from the operating system 5.

Figure 2A:
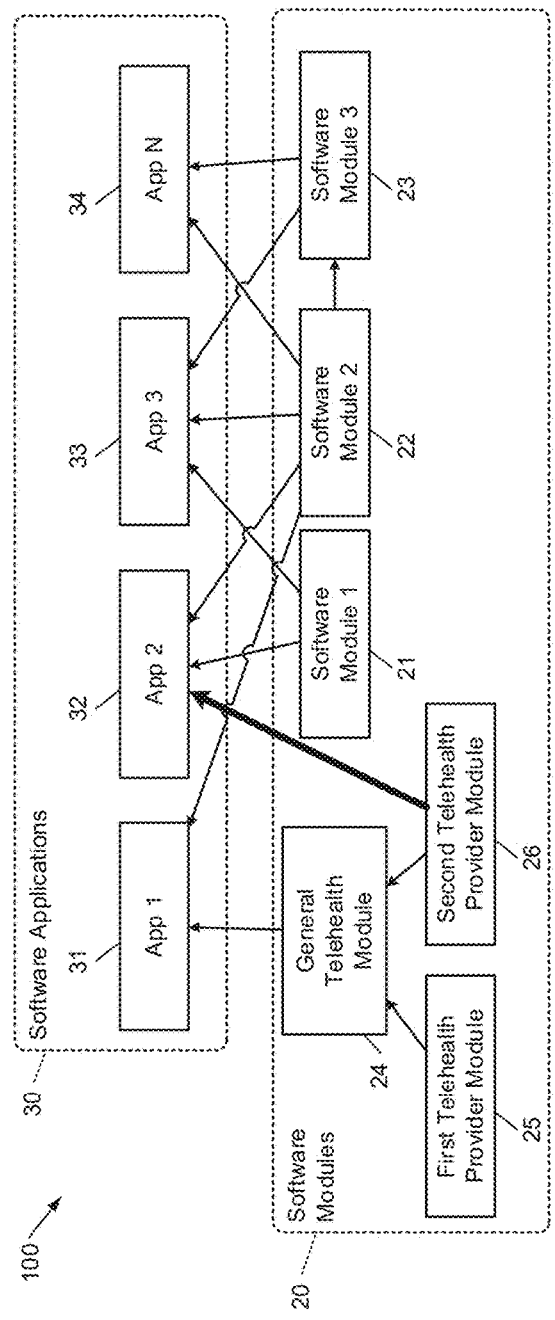
FIGS. 2A and 2B illustrate an example process of migrating dependencies of a software application among different software modules in the system of FIG. 1.
Figure 2B:
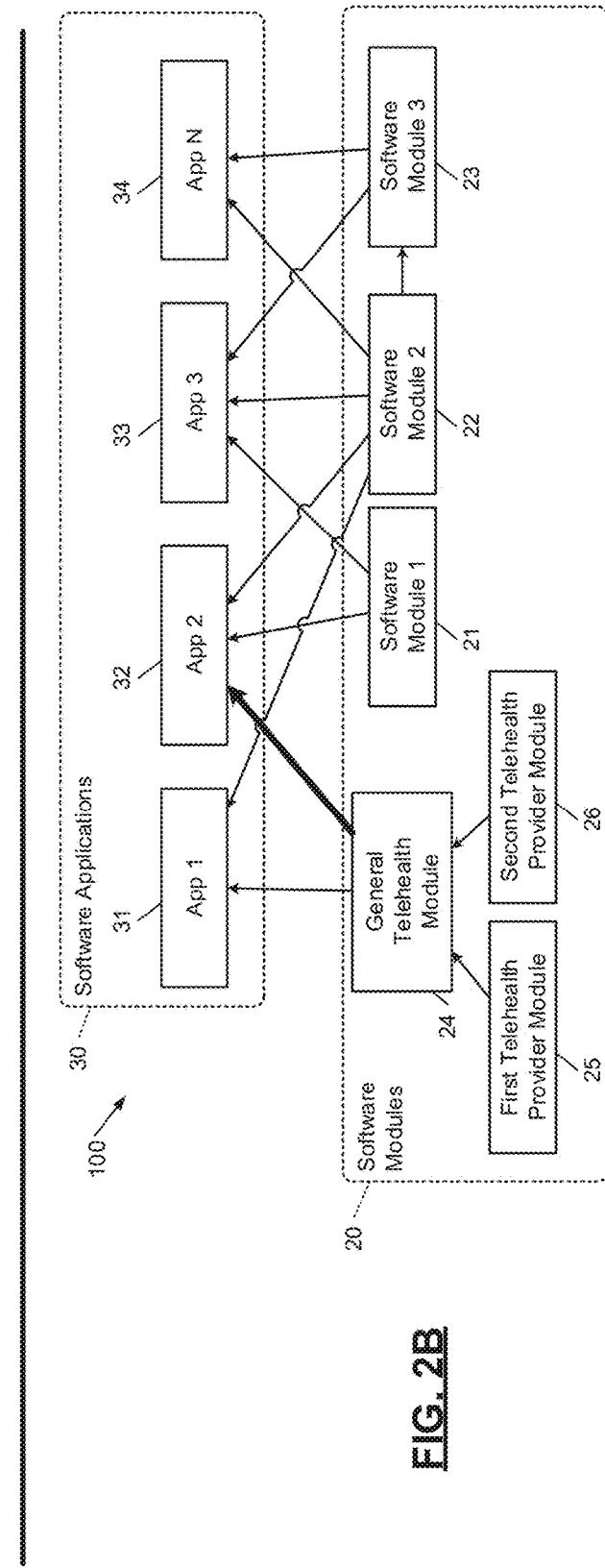

FIGS. 2A and 2B illustrate examples of migrating dependencies among the software applications 30 and the modules 20. For example, some modules 20 may depend on other modules 20 as well. As shown in FIG. 2A, a general telehealth module 24 wraps a first telehealth provider module 25 and a second telehealth provider module 26. The module 22 depends on the software module 23. For example, modules may reference each other by utilizing 'deeplinks' which are managed by example frameworks described herein (e.g., the module 22 can 'fire' a deeplink which is intended for the module 23, but if the application 30 does not include the module 23 an error may be shown to the user).

Each software application 30 may communicate with, incorporate, use, etc., general or specific modules 20. For example, in FIG. 2A, the application 30 uses the general telehealth module 24, while the application 32 uses the specific second telehealth provider module 26. The dependencies may be migrated as different modules 20 are developed.

For example, if the application 32 used the second telehealth provider module 26 historically, and the general telehealth module 24 is subsequently deployed to wrap the second telehealth provider module 26, the application 32 may change its module dependencies to incorporate the general telehealth module 24 instead of the second telehealth provider module 26. This change is illustrated in FIG. 2B. The applications 30 may have the option of changing over to the general module 24 as desired (FIG. 2B), or may continue relying on the specific module 26 (FIG. 2A), according to the application developer preferences.

One example environment for embodiments of this invention is in generating "apps" 30 for healthcare management. In such embodiments, there may be two types of software modules 20—functional modules 20 and activity modules 20. A functional module provides reusable logic and methods, but does not define any UI (e.g., a GUI, etc.) or activities (e.g., screens, etc.). Examples of functional modules 20 are a "Core_Services" module 20 and a "wearables" module 20. In an embodiment, a "Core_Services" module 20 may perform, among other things, network services, environment/server definition, authentication handling, token and cookie management, and request/response processing. A Core_Services module 20 will be discussed in more detail below. In an embodiment, a "wearables" module 20 may integrate with wearable devices (e.g., Garmin®, Jawbone®) and may report to the application 30 on the available data (e.g., step counts, etc.).

An activity module 20 provides reusable logic or methods (like a functional module 20), but also defines its own activities (e.g., screens, etc.) and UI (e.g., GUI, etc.). For example, one or more aspects (e.g., a layout, etc.) of the GUI are provided by a screen model (e.g., Activity Class Extension 12, etc.) incorporated (e.g., extended, etc.) by the activities, and sometimes its own navigational flow (e.g., where the navigational flow is provided by the application 30 that extends a software application model such as the Application Class Extension 11, etc.). Examples of activity modules are a "journal" module 20 and a "programs" module 20.

In an embodiment, a "journal" module 20 may provide a record of an end-user's user experience (UX) and database, for accepting and storing a variety of user input locally on the device using the software application 30. Such a journal module 20 may be capable of handling in-app deep links using configured keys. In an embodiment, a "programs" module 20 may control, present, store, and allow interaction with a set of programs intended to guide end-users through some number of planned activities for specific purposes. Such a module 20 may include service layer interaction for update and storage. One or more of these software modules 20 may be configured using "JSON" (JavaScript Object Notation), which is a data-interchange format, or may interact with JSON-defined elements. Both of these activity modules 20 may provide their own navigational flow (e.g., the navigational flow provided by the software application model extended by the application 30 or by overriding this navigation flow, etc.) by having a defined navigational path from A→Z (e.g., from activity A to activity Z, etc.), rather than a collection of single activities (e.g., selectable from a menu, etc.). These modules 20 also allow apps 30 to step in to the navigational flow at several points by providing specific information. A journal module 20, for example, may bring an end-user to a list of all entries, or to directly create a new entry of a certain type—each of these may have a specific navigation anchor presented to the end-user from the main application 30.

Examples of other software (activity) modules 20 in this embodiment are a "CRM Messaging" module 20, a "Click to Chat" module 20, a "Maps and Location" module 20, a "Telehealth module 20, a "User Assessment" module 20, a "Library/Articles" module 20, and a "Directory" Module 20. The "CRM Messaging" module 20 processes messages and UX, including connection points for application control of user actions. This module displays business promotions to the end-user, including a view pager and an "inbox." The "Click to Chat" module 20 allows an end-user to initiate and complete a Chat-with-an-agent session within a software application 30. The "Maps and Location" module 20 controls and displays all map and location information to an end-user with a standardized interface across device types. The "Telehealth" module 20 includes integrated video teleconference to consulting doctors, including scheduling and other functionality. The "User Assessment" module 20 provides a JSON-configured series of questions that will result in distinct, calculated responses. The "Library/Articles" module 20 is located on the presentation layer for JSON-configured series of articles, sourced either on the end-user's device or on a remote server. This module is capable of deep-linking directly to software applications 30 or of handling in-app deep links using configured keys. The "Directory" module 20 acts like the Yellow Pages for in-network medical services.

The core services library 19 may include presentation of a mobile API layer, data caching (session management), generic service request/response processing, environment switching and management, username+password and FIDO/fingerprint capabilities ("FIDO," a touchID function, stands for "fast identity online"), and MFA capabilities, which may include token MFA, in which an end-user logs in and is sent a token to the end-user's e-mail address or cell phone for confirmation and subsequent input before being allowed to use the app. Core services library 19 may provide the networking backbone for Android applications 30 developed using system 100, including Web SEAL and ISAM (IBM Security Access Manager) server platforms. It may support local data and other test environments. It may also allow concurrent connections to multiple servers, provided they use identical credentials. Core services library 19 may also include an HTTP connections layer.

Common UI components 17 may include individual components that provide more functionality than basic Android components. Components created for any project that can be built and configured in a generic way, to promote reuse and uniformity across applications. Common UI components 17 may include components that support standard theming and may specify custom attributes as appropriate. Custom components may have standardized inputs, charts and graphs, and system extensions. Components may also promote debugging of the UI, may handle photo, video, and/or audio, and may include utilities such as bitmap management and style management.

In an embodiment, common UI components 17 contains a single Android Studio project with two modules, an "app" module and a "commonUItest" module. The "app" module contains CommonUI library code. The "commonUItest" module is an Android project with a test harness, as well as sample layouts and usage of the components. Both are stored and committed in a software repository as often as they are altered, but only the "app" module is exported to a specific implementation of a Maven repository (e.g., a module repository 606, etc.) used by the developer for later access (e.g., in generating a software application using the application configuration engine 608, etc.). The CommonUI library is exported as an .aar file, which means that all resources and strings contained within it are available for use in projects that reference it, in addition to the classes.

The blocks shown in FIG. 1 are examples of parts that may comprise system 100 and do not limit the blocks or parts that may be connected to or associated with these parts. The blocks in FIG. 1 may be implemented in software or hardware or a combination of the two, and may include memory for storing software instructions. Authentication protocols described above include username+password and FIDO/fingerprint, but other methods of authenticating users may be used. Moreover, as stated earlier, this block diagram can be applied to a system using an operating system other than Android. Application, activity, and fragment classes are generally files of code, as is module class 14. Other operating systems include libraries or modules similar to common UI components 17 and core services library 19.

Message Sequence Chart

Figure 3:
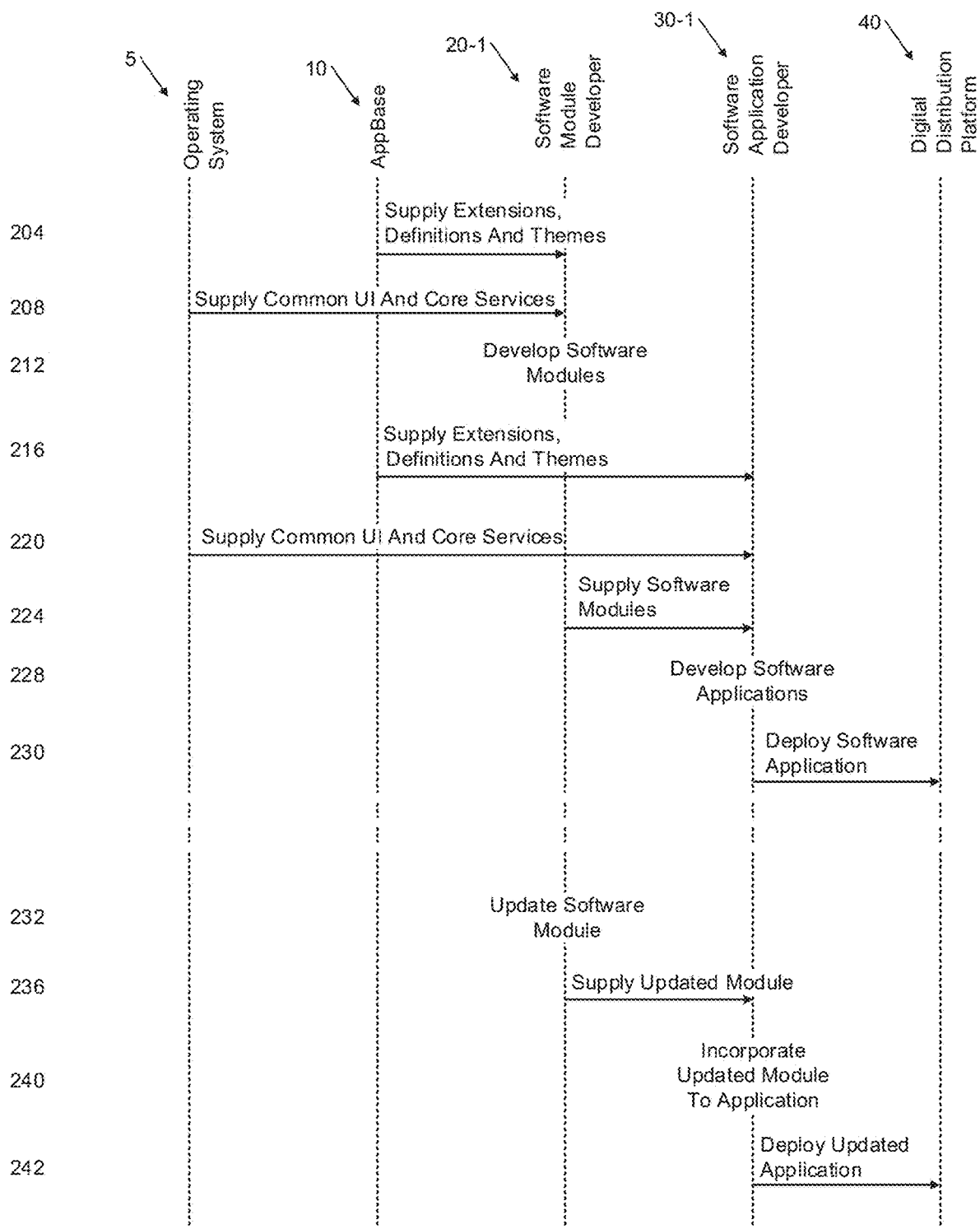
FIG. 3 is a message sequence chart showing example interactions between components of the system of FIG. 1 during an example process of generating a software application.

In FIG. 3, example interactions between the operating system 5, the AppBase 10, a software module developer 20-1, a software application developer 30-1 and a digital distribution platform 40 are illustrated, during a process of creating and deploying an application 30 using one or more software modules 20. At 204, the AppBase 10 supplies extensions, definitions and themes to the software module developer 20-1, and at 208 the operating system 5 supplies the common UI and core services to the software module developer 20-1. The software module developer 20-1 then develops one or more software modules at 212.

At 216, the AppBase 10 supplies extensions, definitions and themes to the software application developer 30-1, and at 220 the operating system 5 supplies the common UI and core services to the software application developer 30-1. At 224, the software modules are supplied from the software module developer 20-1 to the software application developer 30-1, and the software application developer 30-1 then develops one or more software application at 228. The software application developer 30-1 then deploys the software application to the digital distribution platform 40, at 230.

At 232, the software module developer 20-1 updates a software module, and then supplies the updated software module to the software application developer 30-1 at 236. The software application developer 30-1 incorporates the updated module into the application at 240, and deploys the updated application to the digital distribution platform at 242.

For example, and as described further below, a gradle build system may be used where a developed or updated module becomes part of a library, and a software application can use a specific version of the module or always use the latest version of a module in the future. A notification channel may show changes in the latest version, and only the highest version of the module may be included when putting everything together for the application. Therefore, it is not necessary that the same entity creates and uses a module, and multiple application could use a same single module once it is deployed.

Software Module Creation

Figure 4:
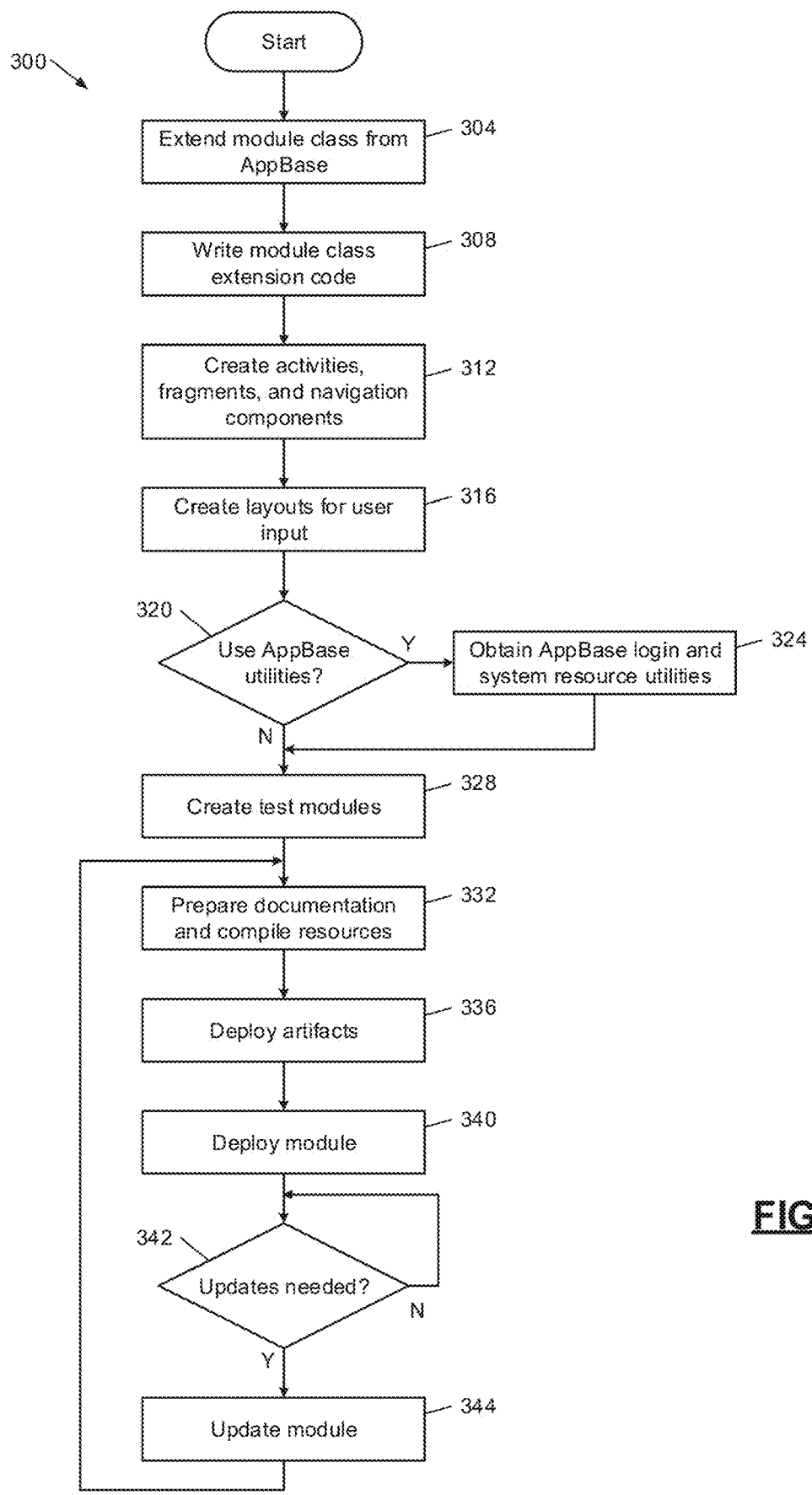
FIG. 4 is a flowchart depicting an example method for creating a software module.

FIG. 4 is a flowchart depicting an example method 300 of creating a software module. Although the example method is described below with respect to the system 100, the method may be implemented in other devices and/or systems. At 304, control begins by extending a class from AppBase.

At 308, control writes class extension code for the module. For example, control may create Android files, create sources, setup databases, etc. At 312, control creates activities, fragments and navigation components for the module. For example, control may set up data that will be passed around between modules or between applications.

Control creates layouts for user input at 316. At 320, control determines whether the module will use AppBase utilities. If yes, control obtains AppBase login and system resource utilities at 324, and proceeds to create test modules at 328. If the module will not use AppBase utilities, control proceeds directly to 328.

At 328, control creates test modules. The test modules may allow for testing without integration of the developed software module, and may provide journal storing details. Unit and functional testing harnesses could be used to focus on one piece of the software module without having to worry about how the software module will be integrated in a software application.

Control proceeds to prepare documentation and compile resources at 332, deploy artifacts at 336, and deploy the module at 340. In various implementations, JAVA docs and sources may be used, at 332, with an Android system resource compile. Tests may be set up before deploying the artifacts at 336 or deploying the module at 340.

At 342, control determines whether any updated are needed to the model. For example, a module developer may determine that additional features should be added to the model, etc. If yes, control proceeds to update the module at 344 by repeating steps 332, 336 and 340 for the updated features.

Referring again to FIG. 1, in various implementations there may be functional modules 20 and activity modules 20. The operations are described using an Android operating system 5, but the concepts can be adapted to other operating systems (e.g., Apple iOS, etc.). To create either type of module 20, AppBase 10 should be imported, for example, within a build.gradle file in a format consistent with the below:
implementation 'com.mobile.base:App_Base:1.0'

AppBase 10 includes the Module Base Definition class 14. The first part of creating a functional module 20 is to create a public class that extends (or incorporates) the Module Base Definition class 14 to create a class that contains all of the information from Module Base Definition class 14 and adds more features to it. Extending this class is based on implementing certain methods, but it serves to register the software module 20 with the generated software application 30 when it is first produced and the software module 20 will subsequently receive notifications from the software application 30 when important events occur (such as a change in the device configuration). Functional modules 20 do not provide their own activities or navigation, so the related methods do not have to be overridden. "Navigation" is a way of specifying the user path through an application 30, or alternatively identifying the specific places in an app 30 to which an end-user may go directly. "Overriding" is a standard Java/Android term/practice common throughout many programming languages, which means that an extending (or incorporating) class can replace the contents of a method in the original class. The created public class defines public methods as appropriate, as well as any helper classes that are needed for module functionality.

Most software modules 20 contain their own database. (A module that does not define or contain its own database may be incapable of storing complex data. Sometimes this is fine, such as with the CRM module 20 described above, which may not need to persist anything across application runs.) Managing the database at the module level allows independent database versioning when upgrading specific modules, as well as allowing different database implementations (Module Base Definition class 14, SQLite/RealmDB) as appropriate for the task at hand. When defining the database name, package-specific naming should be used to prevent collision between module databases.

Creating an activity module 20 may include first creating a module class with the functional module 20, then building out activities and fragments that interact with that functional module class 20. This allows activity modules 20 to define a UI and flow to be used when desired, but also allows software applications 30 to interact directly with the data as additional functionality. Activity modules 20 generally have a single activity entry point and handle internal navigation on their own (i.e., they may not require any application-specific navigation handling to work correctly). Some modules 20, such as the "Programs" and "Journal" modules 20, are more complex and have multiple entry points, stored data, and specific navigation paths. In such a case, each activity should be returned from the getNavigableItems( ) method in module class 14, which means that this specific method should return 0 to many specific entry points into the module 20 that can be shown to the end-user for direct navigation.

Each Android activity and fragment contains a layout that dictates or defines how individual components (e.g., GUI aspects) of the activity or fragment should be placed on the screen when presented to the end-user. Layouts for AppBase Activities may not include toolbars, menus, or other application-level items. In AppBase, these are added by the application 30 itself. When defining layouts and resources, a defining convention is "<moduleidentifier>_<resourcetype>_<resourcename>."
This prevents collision between module resources. Note, however, that this does not include the resources files themselves (strings.xml, etc.), but does include the resource names.

When creating a module, the module 20 may be set up with dependencies on AppBase 10. Additionally, dependencies on CoreServices, CommonUI, or other modules 20 may be included. Modules 20 will be released as fully functional entities ready to be consumed by an application 30, but are not installable on devices on their own. As described above, the Module Base Definition class 14 in AppBase 10 is extended, then the module class extension is populated with code specific and relevant to the module 20. Next, data models, views and network/storage solutions relevant to the module 20 are created, and utility and peripheral classes are created as necessary to complete the functionality of the module 20. Finally, activities are created and navigation points are specified to present functionality to the end-user.

The next step is to publish or deploy the module 20 (a functional or activity module 20) (e.g., to a module repository 606, etc.). Publishing may be necessary because without sending the completed code to an accessible repository, other modules 20/applications 30 may not be able to reference this module 20. A software module 20 can be published directly from a local Android Studio (an IDE), or from a continuous integration (CI) build process like Jenkins. CI is a common development practice to automatically create builds/artifacts for publishing when defined criteria are met. The following code (for the Gradle build system), for example, can be used to publish a module 20 to a module repository 606 configured as Maven repository. Note that the GroupID can be shared, but the ArtifactID+Version combination must be unique in order to deploy successfully. ArtifactIDs should not be reused for modules with different purposes.

```
uploadArchives {repositories}
mavenDeployer}
pom.groupId='com.mobile.module'
pom.artifactId='Journal'
pom.version='0.1.0'
snapshotRepository (url: mavenSnapshots)}
authentication (userName: repoUser, password: repoPassword)
}
repository (url: mavenReleases)}
authentication (userName: repoUser, password: repoPassword)
}
}
}
}
```

The convention for versioning is:
<major_version>.<minor_version>.<incremental_version>

A major version number indicates a release with drastically different code, UI, or behavior. An app owner who moves up a major version should expect more stability and/or functionality, but should also expect to make changes to their code to accommodate the new version. A minor version number indicates a change that adds a small amount of functionality, or otherwise changes existing functionality in a way that can/will break unaltered applications. About 50% of the time, an app owner should expect to make changes to their code when a minor version update occurs.

An incremental version could be a bug fix or patch, or a small amount of new functionality which is not immediately noticeable (like a new method in a utility class). Incremental versions may not require application updates, and may not be a cause for breakage. If things like method signatures are being altered without handling for backward compatibility, a minor version number increase may be used instead.

Filenames also have conventions defined, depending on the use and type, to prevent future collision of resource or activity names—for example, in a format consistent with the below. This is especially important when dealing with resources, because the Android System will overload/replace identically named items automatically.

Resources:
<moduleidentifier>_<resourcetype>_<resourcename>

Here, moduleidentifier is a short, unique character sequence. New modules should ensure that the identifier chosen is not already in use by an existing module; resourcetype is the type of the resource, such as "icon", "img", or "color"; and resourcename is the specific name of the resource. This can be multiple parts and should be as specific as is necessary to allow easy identification.

An example of a Resource name for the Journal module 20 is "journal_color_dashboard_background," which uses "journal" as the moduleidentifier, "color" as the resourcetype, and "dashboard_background" as the name of the background color or image to use on a dashboard screen. Activities and Fragments should begin with a short/common name for the module 20. For instance, the Journal module's main activity that displays all journal entries is called "JournallistActivity." Since the full package identifier can be used, this is more of a courtesy for consuming developers.

Modules 20 may be modified, but this should be done using a protocol. To modify an existing module 20, the module developer opens up the existing codebase (e.g., codebase 604, etc.) in an integrated development environment (IDE). By convention, when using GIT, the latest version of the code should exist under the MASTER branch, but this may vary from module to module. Next, the module developer creates a new branch within this codebase to keep the new code separated until it is completed. A module may contain a standard test harness within its codebase for manually testing the different activities and functionalities provided by the module 20. This test harness is not a part of the module artifact, but exists solely for development purposes within the codebase. (If the module developer adds new functionality to the module 20, the developer should also add corresponding test code to the test harness.)

If the changes made to the module 20 are small and/or completely testable with the test harness, the module can be released. The new code should be committed and merged with the main codebase branch before release. If the changes made to the module 20 require more testing than the test harness can provide, the module developer can "sideload" the module code with an existing application 30 (e.g., App 1 in FIG. 1) using steps consistent, for example, with the below (which are specific to Android Studio):

The following may be added to the App 1 settings.gradle:
include ':<modulename>'
project(':<modulename>').projectDir=new File('<path_to_module_code_directory_on_developer's machine>')

Note that "modulename" is the name of the module that is being modified. And the following should be added to the App 1 build.gradle file to reference the local copy of the module being modified instead of the previous (artifact) version:
//implementation '<artifact>'
implementation project(':<modulename>')

Now when App 1 is compiled, it will be using the local version of the Module so that changes to the Module 20 can be tested. Once the testing is completed, these configuration changes to the App 1 codebase should be reversed.

The details and location of this repository will differ between embodiments, so the method may include a packaging process. The module name and information number, including the version number, are set in the build system file (build.gradle on Android). If desired, a code documentation artifact such as Javadoc may be prepared. This artifact may be released alongside the consumable module artifact (".aar" in Android). Then, the consumable artifacts may be released or deployed to an artifact repository, such as Maven.

Software Application Creation

Figure 5:
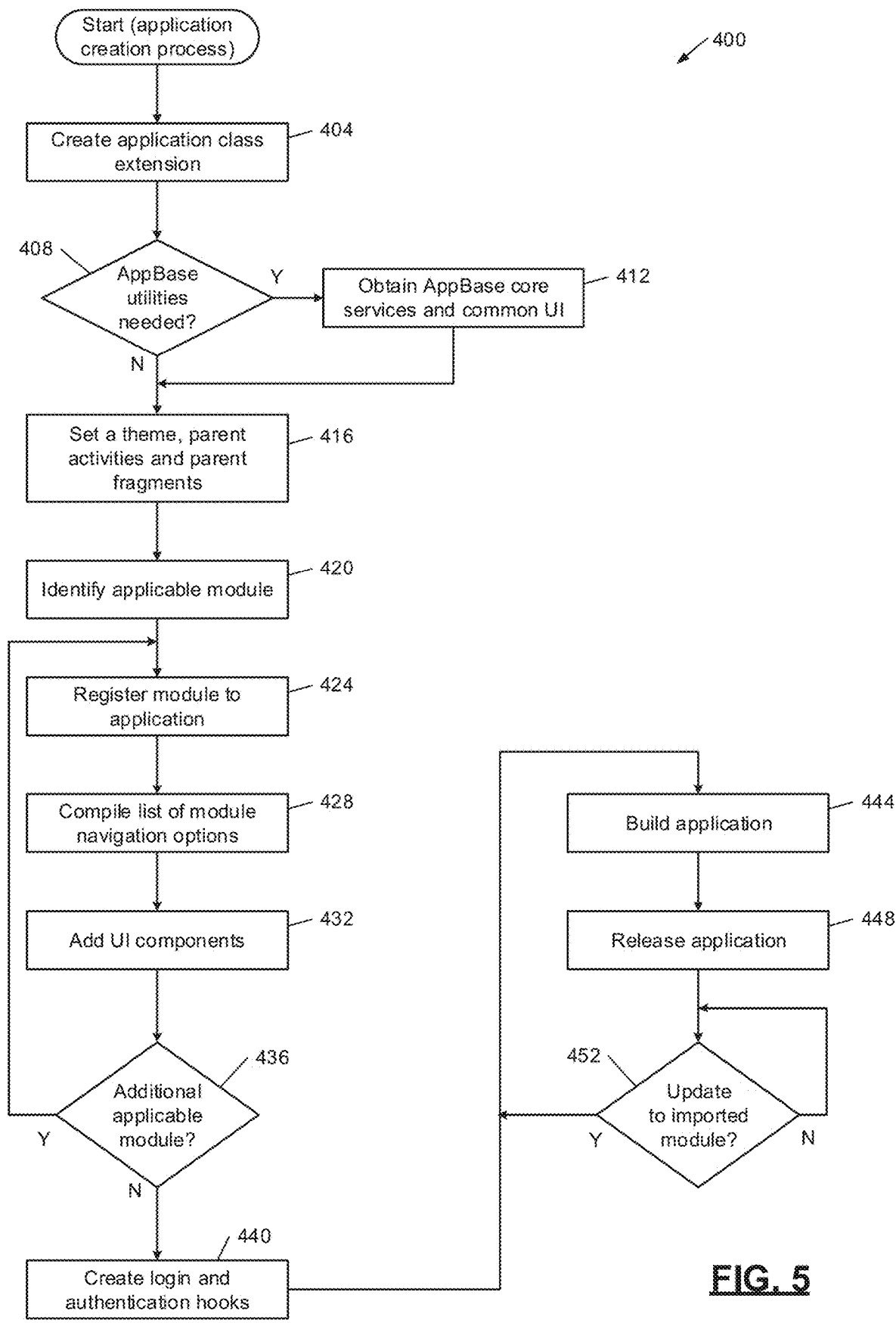
FIG. 5 is a flowchart depicting an example method for creating a software application.

FIG. 5 is a flowchart depicting an example method 400 of creating a software application. Although the example method is described below with respect to the system 100, the method may be implemented in other devices and/or systems. At 404, control begins by creating an application class extension.

At 408, control determines whether any AppBase utilities are needed for the software application. If yes, control proceeds to obtain AppBase core services and common UI at 412, then proceeds to 416. If no AppBase utilities are needed at 408, control proceeds directly to 416.

At 416, control sets a theme for the application, and sets parent activities and fragments (e.g., a controlling activity that tells the application what to do initially). For example, a custom class extension may register modules and hook up navigation activities, fragments, etc. that are accessible from outside the application.

Control proceeds to identify applicable modules to be included in the application at 424, and then register an identified module to the application at 424. For example, a journal may extend an AppBase class and register the extended class to the software application. At 428, control compiles a list of module navigation options, such as a list of what elements the module may navigate to. For example, a module may be registered and the main application can execute a blast to search for locations that the application can link to (e.g., navigation points), the navigation points may be manually set by a module developer, a mix of automatic and manual navigations settings may be performed, etc. This can provide main and sub menus for the application.

At 432, UI components are added for the module. When the module becomes part of the application, the module may refer to an activity, fragment, etc., which may define a list of things that can be used, clicked on, etc. to add extra customization.

Control then determines at 436 whether an additional applicable model is needed for the software application. If yes, control repeats steps 424, 428 and 432 to add the additional module to the software application. Once no further modules are needed for the software application, control proceeds to 440 to create login an authentication hooks. For example, in an application class the Android system may call an initialization process. The application class may wait to initialize a telehealth module until after a user login, and the initialization may occur any time before the module is actually used. User login and logout features may be part of core service manager calls, and the software developer may create login and logout hooks to the core (e.g., authentication, cookies, etc., where the service calls handle network stack features).

At 444, control builds the application, and then the application is released at 448 (e.g., for download/install from a digital distribution platform, etc.). At 452, control determines whether any updates have occurred for imported modules of the software application. If yes, control builds the application at 444 with the updated module, and releases the updated application.

Referring again to FIG. 1, once a module 20 is published or deployed, it can be used by various software applications 30. This will vary based on the current software application 30 as well as the specific module 20 to be used. Here are a few of the most common use cases. For a software application 30 to use a functional module 20, the library should be referenced from its build.gradle settings, for example, in a format consistent with the below:
implementation 'com.module.wearable:SEIWearables:1.0'

Once included as a dependency, the module methods can be called as if they are part of the software app, for example, in a format consistent with the below:
new WearableDeviceModule (this)

For a software application 30 to use an activity module 20, the application 30 must first be built on top of AppBase 10, which defines a base activity and fragment (for example, a screen model such as an Activity Class Extension 12 or Fragment Class Extension 13, etc.). AppBase 10 also assists with Android M permissions and navigation destinations in a centralized manner. By using AppBase 10 as the root of both the software application 30 and the software modules 20, the two can work with each other seamlessly with a minimal number of callbacks or compatibility issues. Again, AppBase 10 may be imported for the software application 30 (e.g., within a build.gradle file, etc.), for example, in a format consistent with the below:
implementation 'com.mobile.base:App_Base:1.0'

After building the software application 30 on AppBase 10 (including using (e.g., incorporating or extending, etc.) Application Class Extension 11 for the app 30), an activity module 20 can be used by referencing it from the Maven repository (e.g., a module repository 606, etc.), and calling its activity/activities, for example, in a format consistent with the below:
implementation 'com.mobile.module:Journal:1.0'
new Intent (getContext( ), JournalActivity.class)

Once a module 20 has been released, it is available for consumption from the hosting repository. For example, an AppBase application project is created, repository information is added to the build system, and the module name+version is added to the dependency list (both of which are within build.gradle in Android). At boot, or at first desired use, the module 20 is initialized with any required information. This may be a call to .initialize( ) or a similar method within the module class extension, passing the application's context. In some cases, other configurations are passed as well. Finally, the module 20 is ready for use.

In various implementations, other operations or series of operations may be used to generate a software module 20. For example, operations were described using Gradle as a build system to configure AppBase 10. Android (and many systems) use Gradle to control builds, but there are other build systems as well which can similarly configure AppBase 10. Moreover, the actual order of the operations in the flowchart may not be critical.

As another example, the software application 30 must specify Application Class Extension 11 (e.g., a software application model consistent with that which is described above in reference to method 500, etc., or a descendant) in its AndroidManifest.xml. If the software application already has its own class, then Application Class Extension 11 may be extended rather than using the basic android Application. This helps control navigation, because this is the only place common to both application code and modules, so lacking Application Class Extension 11 may result in an inconsistent experience throughout an app 30. The application class extension (or software application model) is specified, for example, in a format consistent with the below in AndroidManifest.xml as:
<application
android:
name="com.mobile.base.ApplicationClassExtension"
android:theme="@style/AppBaseTheme" . . . >

Application Class Extension 11 controls locale-locking (optional via config.xml), navigation, user login/logout, and module management. Navigation (and the activities that may be navigated to) do not exist by default; navigation defined in software modules 20 may be added automatically for reference, but does not become the main navigation of an application 30 unless set. For example, navigation is turned OFF by default as a safety measure (to ensure navigation provided by the application class extension is being used); to turn it on, the following, for example, should be added to the extended Application Class Extension 11:
@Override
public boolean appUsesNavigation( ){return true; }

To provide the list of navigable activities to the software application 30, the getNavigationlist( ) method in the extended application class extension 11 class must be overridden.

The software application 30 may specify in AndroidManifest.xml Theme 15 (e.g., a theme consistent with that which is described above in reference to method 500, etc.) or an extension as its theme (the syntax is shown in the above paragraph). Theme 15 sets some standards that can be overridden as appropriate in the software applications 30. Typically, apps 30 will customize their theme by defining the AppBase Theme as the "parent" and replacing values as required. If a different theme is used in the application 30 (or Theme 15 is reset), the software application 30 may use an AppCompat theme with no action bar (the top area on an Android screen that contains title and other common elements), and may provide its own custom attributes, including menu background, menu item background, menu icon color, menu item text appearance, toolbar theme, toolbar pop-up theme, tab text color, tab selected text color, toolbar icon color, toolbar home icon, toolbar home left margin, and toolbar title left margin. (AppCompat is a set of support libraries that may be used to make apps developed with newer Android versions operate with older Android versions.)

The software application 30's activities may extend Activity Class Extension 12 (e.g., a screen model consistent with that which is described above in reference to method 500, etc.). Activity Class Extension 12 provides standardized layout and navigation handling that apply to all applications 30 and activity modules 20.

The application fragments in the software application 30 may extend Fragment Class Extension 13 (e.g., a screen model consistent with that which is described above in reference to method 500, etc.). Fragment Class Extension 13 provides some helpful methods to app owners, but not all apps will use fragments and not all fragments will have use for those methods. It is still recommended to extend Fragment Class Extension 13 to allow for future support.

User management may be handled through the logInUser(user) and logOutUser( ) calls on Application Class Extension 11 (accessible via the app( ) convenience method). (App( ) is a reference to the current instance of Application Class Extension 11 from the current Activity Class Extension 12 or Fragment Class Extension 13; it is a convenience method, since typically there are several steps to obtain the application reference from an activity or fragment.) This allows both the app 30 and any module 20 to access the current user ID at any time via the command app( ).getUserId( ). This is noteworthy, because many modules will use the UserID as the key to the storage methodology for the modules.

Besides the operations described above, other operations or series of operations may be used to generate a software application 30. Moreover, the actual order of the operations in the flowchart may not be critical.

Software Application Startup

Figure 6A:
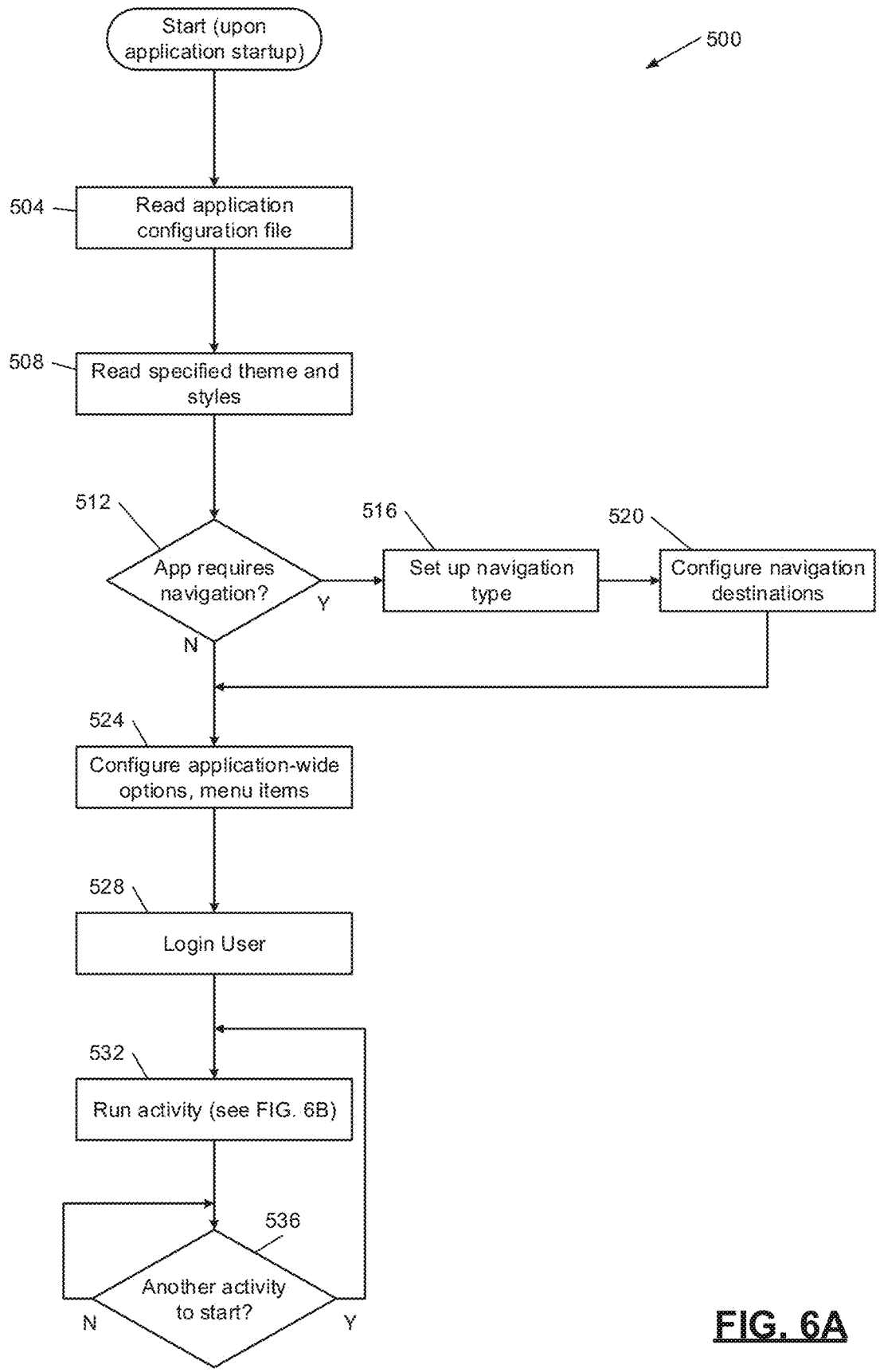
FIG. 6A is a flowchart depicting an example method for starting up a software application.

FIG. 6A is a flowchart depicting an example method 500 for starting up a software application. Although the example method is described below with respect to the system 100, the method may be implemented in other devices and/or systems. At 504, control begins by reading an application configuration file. For example, an xml file may include all application configurations (e.g., AppBase may define a default configuration and the software application can override it for Android to manage things, such as push notification, etc.).

At 508, control reads specified themes and styles for the application. The application may override a default theme from AppBase. For example, an application may use a different background color, variants of different clients may use different themes to distinguish one another, etc.

Control then determines whether the software application requires navigation at 512. If no, the control proceeds to 524. If the application does require navigation, control proceeds to set up the navigation type at 516, and configures navigation destinations at 520. For example, in an application, navigation flags may be set that indicate whether any modules of the application have navigation points to locate. Navigation types could include a bottom menu bar, a hamburger menu, etc., which may be defined in a specific AppBase platform.

At 524, control configures application-wide options and menu items. For example, the application class may initialize a chat menu and set a flat, set objects in a global menu, add different items to an options menu of the application, etc. At 528, control logins in a user, and then an activity is started at 532 (which is described further in FIG. 6B).

Control determines whether a next activity is ready to start at 536. If so, control returns to 532 to run the next activity. For example, each of the application may start in order, or run separately, after the application starts. Any number of activities can run at the same time, where one activity may run until finished then a second activity runs until finished, etc. In the Android operating system, each fragment is part of an activity. An activity may have zero, one or multiple fragments, and each host fragment may have sub-fragments. Each activity belongs to an application, with one application class in a software application. The application can have as many activities as desired.

Figure 6B:
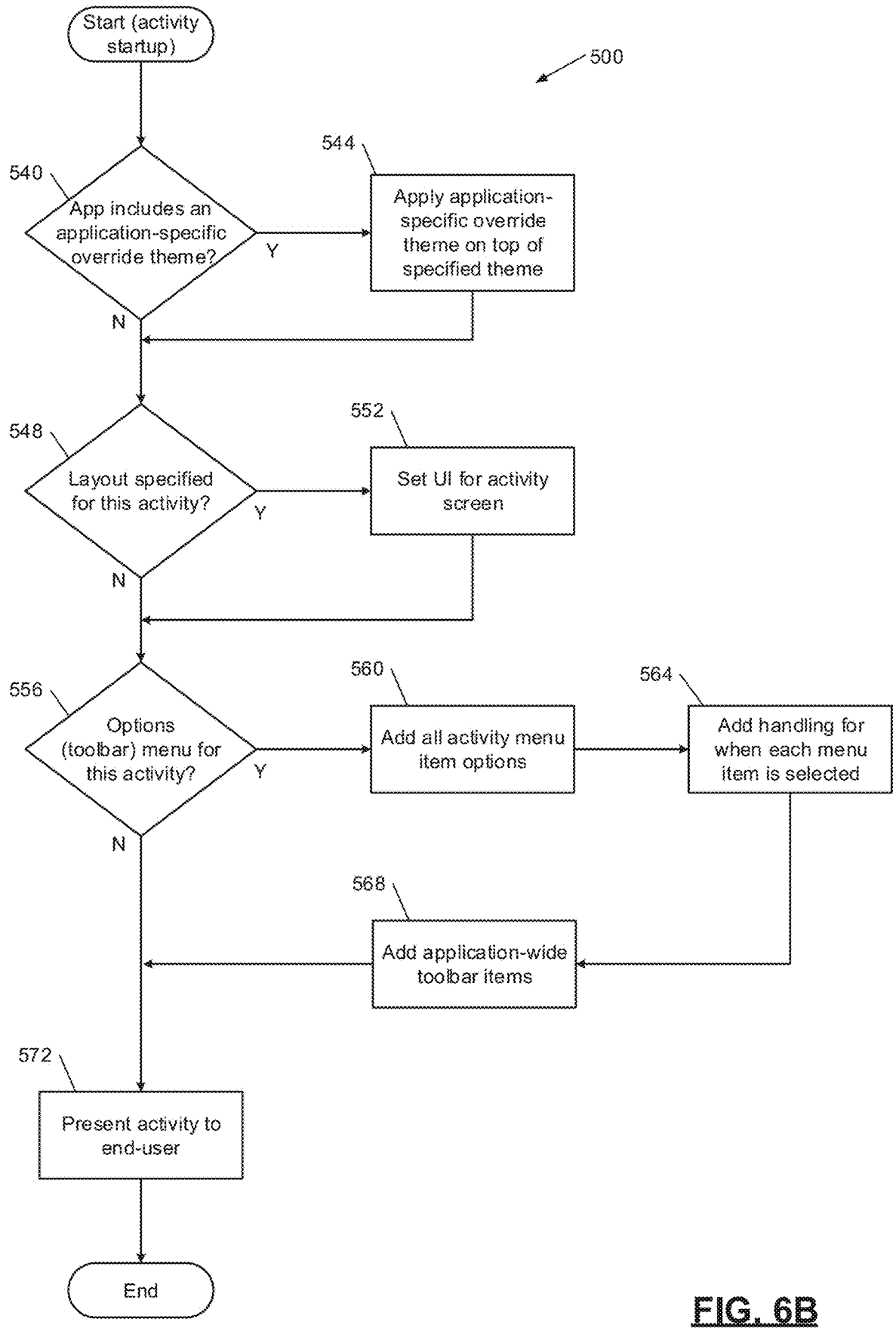
FIG. 6B is a flowchart depicting an example method for starting up an activity of a software application.

FIG. 6B is a flowchart depicting an example method for starting up an activity, which may occur at 532 in the method 500 of FIG. 6B. At 540, control determines whether the application incudes an application-specific override theme. If yes, control applies the application-specific override theme on top of the specified theme at 544. At 548, control determines whether a layout is specified for the activity. If yes, control sets a UI for the activity screen at 552.

Control then proceeds to 556 to determine whether there is an options toolbar menu for the activity. If yes, control adds all activity menu item options at 560, and adds handling for when each menu item is selected at 564. Control then adds application-wide toolbar items at 568. At 572, the activity is presented to the end-user.

Referring back to FIG. 1, in various implementations the app owner first determines the theme and styles for the app. In a conventional app, the standard Android theme elements, defined by the operating system, may be configured via XML by the application. In addition to the standard elements, AppBase 10 defines additional theme items for applications to configure via XML by the application. Themes are handled at the base level, which is common to all applications 30 and modules 20 built on AppBase 10, which means the specified theme(s) apply to every visible activity and fragment, presenting a seamless experience to the end-user.

When the application starts, navigation may be set up if required. Navigation destinations are configured by the Application 30 and referenced from the AppBase 10 base activity class and, in particular, Application Class Extension 11. In this way, navigation is automatically set up for each individual activity as soon as it is created, and all modules 20 built on (e.g., extending or integrating, etc.) AppBase 10 (and therefore using the same common base class) can be used within any app 30 built on AppBase 10, and thus the same user experience will be presented throughout.

This navigation setup differs from prior methods. Here, navigation is configured by the Application 30, whereas the prior method was configured by the Activity (and thus occurred later in the flow). In the prior method, each Activity explicitly loaded the destinations and handling—usually from a common utility method—because the Activity UI includes the layout information, which needed to be present before the setup could continue. (A common utility method is a typical development approach for navigation and other use cases in which a single method is created in the codebase and is subsequently called by every activity.) In turn, this meant that all Activities needed access to all of the destination/handling data and/or the common utility method, which precluded third-party libraries from being able to present an identical user experience.

Next, supported/locked locales (languages) may be set up. AppBase 10 adds the ability for app-configured locale locking. AppBase 10 contains XML, configurations for supported languages and default language, which allows an app 30 to identify a specific set of locale content that may be used. In this way, apps that include modules 20 that may have different sets of content available can prevent the sometimes-available content from being used, and present the end-user with a single-language experience.

This locale ability differs from the standard Android capability, which allows for content to be provided in any number of languages, and the end-user's device locale will determine which content set will be used. If a matching set is available, that content will be loaded; if not, the main set (typically US English) will be used. When using third-party libraries, this can result in different sections of the application 30 rendering content in different languages (as available).

After setting up the locales, any application-wide options and menu items may be added and configured. Similar to navigation, an Application can configure toolbar items to be automatically placed on all activities. This differs from the standard Android situation in which each activity sets up and configures its own toolbar menu, and if toolbar items are common across multiple activities, each activity must set those items up individually. Later, each activity may add its own custom items to the toolbar menu so that the experience to the end-user will be seamless throughout the app 30, while still allowing for specific actions to be taken within activities.

Next, the Activity starts. An application-specific override theme will be applied if available, the Activity layout is setup, and the Activity toolbar is set up. AppBase 10 adds the ability to override the application theme at runtime, allowing for customized user experiences based on real-time data. Since this is handled in the basic (or base) class (e.g., Application Class Extension 11), the override theme (as with the standard theme set up in operation 405) applies to all modules 20 to present a seamless experience to the end-user. This differs from standard Android, which has no concept of an app-wide theme override—only the compile-time configured themes are used. If there is an application-specific override theme, that theme is applied on top of the default theme.

If there is a layout for this activity, the UI is set for the activity screen and references to accessible fields are captured from the layout. With an application 30 built on AppBase 10, the Activity UI is concerned only about its specific content—the toolbars, navigation anchors, and other "app-level" considerations are left to the platform. This differs from the standard Android case, in which the Activity UI would include the entire renderable screen, including toolbars, navigation anchors, etc.

If there is an options or toolbar menu for the activity all menu item options are added, and handling for when each menu item is selected is added. After the override theme, layout, and options menu are selected, the activity is presented to the end-user.

Accordingly, a system and method for generating a software application are provided that provide standardization of design and implementation across a family of software applications, allow discrete, standalone pieces of functionality to be written once and used across multiple software applications, and allow service reuse according to functionality, eliminating the need to clone service layers for different software applications. The aspects that differentiate this approach and help overcome some of the limitations of prior methods include having an application codebase with extensions to the Application, Activity, and Fragment classes, as well as a module class and a theme. This application codebase underlies the theme and styles for an application, allows navigation to be configured by the Application, rather than by the Activity, and sets up locales and languages configured by the app. Having a common application codebase on which modules are built, when a module is updated, that update may be distributed to each application that uses the module, thus reducing the workload of the application owner.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between engine) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple engines. Group processor hardware encompasses a microprocessor that, in combination with additional microprocessors, executes some or all code from one or more engines. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple engines. Group memory hardware encompasses a memory device that, in combination with other memory devices, stores some or all code from one or more engines.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented method for generating a software application, the method comprising:
   receiving, from a codebase of an integrated development environment, a module base definition class, wherein the codebase includes an application class extension, an activity class extension, the module base definition class, and a theme;
   creating a set of reusable software modules by extending the module base definition class, wherein each reusable software module of the set is independently created and agnostic to a particular software application, and wherein each reusable software model defines a set of graphical user interface (GUI) aspects;
   for each reusable software module, creating at least one activity for the reusable software module using the activity class extension from the codebase, wherein the activity class extension provides a standardized layout and navigation handling that applies to all activities of all reusable software modules built from the activity class extension;
   programmatically building the software application, including:
      registering, using the application class extension, a plurality of reusable software modules from the set to the software application; and
      configuring, using the application class extension, navigation for each activity of each reusable software module registered to the software application;
   updating at least one of the plurality of reusable software modules;
   in response to a previous version of the at least one reusable software module having been registered to the software application prior to updating the at least one reusable software module, registering the updated at least one reusable software module to the software application; and
   initializing the software application as a configuration file, wherein the initialization automatically applies the theme to each activity of each reusable software module registered to the software application, and wherein the application of the theme unifies the set of GUI aspects defined by each reusable software module of the plurality of reusable software modules registered to the software application to form a GUI of the software application.

2. The computer-implemented method of claim 1, wherein applying the theme includes applying an application-wide override theme on top of a default theme for the at least one activity at startup of the at least one activity.

3. The computer-implemented method of claim 1, further comprising:
configuring the at least one activity to set a user interface for a screen of the at least one activity,
wherein content of the user interface is determined by the at least one activity and arrangement of toolbars and navigation anchors of the user interface is determined by the software application.

4. The computer-implemented method of claim 1, further comprising:
creating at least one fragment for a respective reusable software module of the set using a fragment class extension from the codebase, the fragment class extension providing a standardized layout and navigation handling that applies to all fragments of all reusable software modules built from the fragment class extension; and
configuring the software application to arrange navigation for each fragment of each reusable software module registered to the software application, to present a same user experience throughout the software application,
wherein initializing the software application automatically applies the theme for each fragment of each reusable software module registered to the software application, to present a same user experience throughout the software application.

5. The computer-implemented method of claim 1, wherein creating the set of reusable software modules includes creating multiple reusable software modules, each reusable software module including at least one corresponding activity.

6. The computer-implemented method of claim 1, further comprising maintaining the previous version of the at least one reusable software module in the software application when the previous version of the at least one reusable software module had been registered to the software application prior to updating the at least one reusable software module.

7. The computer-implemented method of claim 1, wherein the at least one of the plurality of reusable software modules comprises a general reusable software module from which at least one other reusable software module depends.

8. The computer-implemented method of claim 7, further comprising, in response to registering the general reusable software module into the software application, removing the at least one other reusable software module from the software application.

9. The computer-implemented method of claim 1, wherein:
creating the set of reusable software modules includes obtaining common UI and core services components from an operating system;
creating the software application includes creating login and authentication hooks using the obtained core services components; and
the method further comprises deploying the software application to a digital distribution platform.

10. The computer-implemented method of claim 1, wherein:
the codebase further includes a fragment class extension and
the application class extension, the activity class extension, and the fragment class extension comprise extensions of base application, activity and fragment classes of an ANDROID operating system.

11. A computer system comprising:
memory configured to store a codebase, multiple reusable software modules, and computer-executable instructions, wherein:
the codebase includes an application class extension, an activity class extension, a module base definition class, and a theme,
each reusable software module is an extension of the module base definition class from the codebase and includes at least one activity built from the activity class extension of the codebase,
each reusable software module is independently created and agnostic to a particular software application,
each reusable software model defines a set of graphical user interface (GUI) aspects, and
the activity class extension provides a standardized layout and navigation handling that applies to all activities of all reusable software modules built from the activity class extension and
at least one processor configured to execute the instructions,
wherein the instructions include:
programmatically building the software application, including:
registering, using the application class extension, multiple reusable software modules to the software application; and
configuring, using the application class extension, navigation for each activity of each reusable software module registered to the software application;
updating at least one of the plurality of reusable software modules;
in response to a previous version of the at least one reusable software module having been registered to the software application prior to updating the at least one reusable software module, registering the updated at least one reusable software module to the software application; and
initializing the software application as a configuration files, wherein the initialization automatically applies the theme for each activity of each reusable software module registered to the software application, and
wherein the application of the theme unifies the set of GUI aspects defined by each reusable software module of the multiple reusable software modules registered to the software application to form a GUI of the software application.

12. The computer system of claim 11, wherein applying the theme includes applying an application-wide override theme on top of a default theme for each activity at startup of each activity.

13. The computer system of claim 11, wherein:
each activity includes a user interface for a screen of the activity and
content of the user interface is determined by the activity and arrangement of toolbars and navigation anchors of the user interface is determined by the software application.

14. The computer system of claim 11, wherein:
the codebase incudes a fragment class extension,
each reusable software module includes at least one fragment built from a fragment class extension from the codebase, the fragment class extension provides a standardized layout and navigation handling that applies to all fragments of all reusable software modules built from the fragment class extension, the instructions further include configuring the software application to arrange navigation for each fragment of each reusable software module registered to the software application, to present a same user experience throughout the software application, and initializing the software application automatically applies the theme for each fragment of each reusable software module registered to the software application, to present a same user experience throughout the software application.

15. The computer system of claim 11, wherein:

the codebase further includes a fragment class extension and the application class extension, the activity class extension, and the fragment class extension comprise extensions of base application, activity and fragment classes of an ANDROID operating system.

16. A computer-implemented method for generating a library of reusable software modules, the method comprising:

creating a first reusable software module by extending a module base definition class from a codebase, the codebase including an application class extension, an activity class extension, a fragment class extension, the module base definition class, and a theme;

creating at least one activity for the first reusable software module using the activity class extension from the codebase, the activity class extension providing a standardized layout and navigation handling that applies to all activities of all reusable software modules built from the activity class extension;

storing the first reusable software module in the library of reusable software modules;

creating a second reusable software module by extending the module base definition class from the codebase, wherein each of the first reusable software module and the second reusable software module is independently created and agnostic to a particular software application;

creating at least one activity for the second reusable software module using the activity class extension from the codebase;

creating at least one fragment for the at least one activity of the second reusable software module using the fragment class extension from the codebase;

storing the second reusable software module in the library of reusable software modules;

updating the first reusable software module or the second reusable module;

storing the updated first reusable software module in the library of reusable software module, wherein the library of reusable software modules:

facilitates creation of a software application using the application class extension and the theme from the codebase, facilitates registration of the first and second reusable software modules to the software application, in response to facilitating registration of a previous version of the first reusable software module, facilitates registration of the updated version of the first reusable software module, and facilitates configuration of the software application to arrange navigation for each activity and fragment of the first and second reusable software modules and to apply the theme for each activity and fragment of the first and second reusable software modules; and programmatically building the software application, wherein application of the theme unifies a set of graphical user interface (GUI) aspects defined by each reusable software module of the first and second reusable software modules registered to the software application to form a GUI of the software application.

17. The computer-implemented method of claim 16, further comprising:

creating at least one fragment for the at least one activity of the first reusable software module using the fragment class extension from the codebase, the fragment class extension providing a standardized layout and navigation handling that applies to all fragments of all reusable software modules built from the fragment class extension and creating at least one fragment for the at least one activity of the second reusable software module using the fragment class extension from the codebase.

18. The computer-implemented method of claim 16, wherein:

the codebase further includes a fragment class extension and the application class extension, the activity class extension, and the fragment class extension comprise extensions of base application, activity and fragment classes of an ANDROID operating system.

* * * * *